United States Patent
Walker

[19]

[11] Patent Number: 6,016,394
[45] Date of Patent: Jan. 18, 2000

[54] METHOD AND SYSTEM FOR DATABASE APPLICATION SOFTWARE CREATION REQUIRING MINIMAL PROGRAMMING

[75] Inventor: Jeffrey L. Walker, Ross, Calif.

[73] Assignee: TenFold Corporation, Draper, Utah

[21] Appl. No.: 08/932,255

[22] Filed: Sep. 17, 1997

[51] Int. Cl.[7] .................................................. G06F 9/445
[52] U.S. Cl. .......................................................... 395/701
[58] Field of Search ........................... 395/701; 707/103; 364/282.1; 345/356, 334

[56] References Cited

U.S. PATENT DOCUMENTS

| | | | |
|---|---|---|---|
| 4,528,644 | 7/1985 | Soderberg | 705/410 |
| 4,827,404 | 5/1989 | Barstow et al. | 364/200 |
| 4,831,526 | 5/1989 | Luchs et al. | 364/401 |
| 4,949,253 | 8/1990 | Chigira et al. | 364/200 |
| 5,038,296 | 8/1991 | Sano | 364/513 |
| 5,353,401 | 10/1994 | Iizawa et al. | 345/335 |
| 5,381,534 | 1/1995 | Shi | 395/200 |
| 5,381,548 | 1/1995 | Matsuo | 395/700 |
| 5,423,041 | 6/1995 | Burke et al. | 395/700 |
| 5,437,027 | 7/1995 | Bannon et al. | 707/103 |
| 5,485,601 | 1/1996 | Ching | 395/500 |
| 5,485,610 | 1/1996 | Gioielli et al. | 395/600 |
| 5,495,567 | 2/1996 | Iizawa et al. | 345/334 |
| 5,504,885 | 4/1996 | Alashqur | 395/600 |
| 5,566,330 | 10/1996 | Sheffield | 707/4 |
| 5,586,314 | 12/1996 | Hill et al. | 395/604 |
| 5,615,379 | 3/1997 | Wehle | 395/701 |
| 5,819,090 | 10/1998 | Wolf et al. | 709/302 |
| 5,819,251 | 10/1998 | Kremer et al. | 707/1 |
| 5,830,065 | 11/1998 | Sitrick | 463/31 |

OTHER PUBLICATIONS

Title: Surfing the Web gets new smarts—Neural–learning and fuzzy–logic tools add intelligence to Internet advertising, Author: Johnson, Colin R, source: Electronic Engineering Times, dated: Jan. 5th, 1998.

Efficient and Language–Independent Mobile Program, Author: Adl–Tabatabai, ACM, May 1996.

*Primary Examiner*—Tariq R. Hafiz
*Assistant Examiner*—Chameli Chaudhuri Das
*Attorney, Agent, or Firm*—Kirton & McConkie; Michael F. Krieger

[57] ABSTRACT

A system and method for computer-assisted database management software creation of a target software application from a description known as a dictionary interoperating with a universal software application. The dictionary contents customize the universal application into the target software application created from a high-level dialog between an application designer and a graphical application editor. The application editor provides an environment for editing and creating custom applications and automatically creates security partitioning of responsibilities and users, hierarchical menu structures, groupings of database data elements into efficient sets, database transactions and database partitioning without requiring programming in SQL language by an application designer. The computer stores the dictionary in a database for accessing by the universal application. The dictionary customizes the re-usable universal application for interaction with relational databases such as Oracle®, IBM® DB2, and Sybase®.

27 Claims, 11 Drawing Sheets

| | UNIVERSAL APPLICATION | 108 |
|---|---|---|
| 224 | ANALYZER | DATASCOPE | 262 |
| 226 | AUTOTEST | NETWORK LIBRARY | 264 |
| 228 | REPORTER | MESSAGE LIBRARY | 266 |
| 230 | DATAMOVER | INTEGRITY CHECKER | 268 |
| 232 | CLIENT | SERVERS | 270 |
| 234 | FRAMECOMPOSER | TRANSACTION SERVER | 272 |
| 236 | MANAGER | SUMMARY ENGINE | 274 |
| 238 | DATABASE LIBRARY | HIERARCHY ENGINE | 276 |
| 240 | TRANSPORT ENGINE | TRANSFORMATION SERVER | 278 |
| 242 | COMPILER | C CODING STANDARDS | 280 |
| 244 | LANGUAGE | USER INTERFACE LIBRARY | 282 |
| 246 | METAFILE LIBRARY | MESSAGE STANDARDS | 284 |
| 248 | REGRESSION TEST LIBRARY | GRAPHIC INTERFACE STANDARD | 286 |
| 250 | OPTIONS FILE LIBRARY | GRAPHIC INTERFACE LIBRARY | 288 |
| 252 | VALIDATION LIBRARY | RELEASE MANAGEMENT | 290 |
| 254 | KNOBS & DIALS LIBRARY | INTERPRETER | 292 |
| 256 | ERROR LIBRARY | METAFILE STANDARD | 294 |
| 258 | COMMON ROUTINES LIBRARY | PREFERENCES STANDARD | 296 |
| 260 | OPERATING SYSTEM LIBRARY | | |

FIG. 7

METHOD AND SYSTEM FOR DATABASE APPLICATION SOFTWARE CREATION REQUIRING MINIMAL PROGRAMMING

BACKGROUND OF THE INVENTION

1. The Field of the Invention

The present invention relates to computer programming, and more particularly, to the automatic creation of database-interactive software applications. Yet more particularly, the present invention relates to the software-based creation of custom applications resulting from a high-level man-machine dialogue as opposed to traditional computer programming or Computer Assisted Systems Engineering (CASE) technologies.

2. Present State of the Art

Complex, mission-critical business software applications are typically comprised of large numbers of transactions, in addition to a sophisticated end-user interface for each transaction, an intricate relational database, recurring and ad hoc reporting capabilities, server-based computation-intensive software components, and complementary software integration components. Due to the complexity of the application and its components; difficulties associated with recruiting, managing, and retaining highly technical staff, and uncertainties of managing large projects in complex and changing business environments; the design, development, and implementation of mission-critical software applications is expensive, highly risky, and often unsuccessful.

Furthermore, as mission-critical software applications are improved and evolve, they become increasingly complex thus requiring additional economic and physical resources to enhance, debug, and maintain. Even relatively simple or minor modifications to mission-critical software applications require extensive understanding and re-testing of the revised software application.

Additionally, programming methodologies associated with software application development have changed very little over the past two decades. Even though the commercial marketplace is filled with a variety of development tools and new programming languages, mission-critical software applications continue to require considerable programming—in at least one programming language. Improvement in programming productivity is impeded by traditional paradigms related to traditional tasks such as tedious and time-consuming design document creation, low-level application coding, manual testing and debugging of written code, and the error-prone nature of software application correction and improvement.

Other deficiencies inherent in traditional complex software application development result from variations in quality through all phases of development such as requirements definition, design specification, programming, testing, and all related communications between customers, end-users, designers, systems analysts, programmers, and testers. For example, software application programmers are often isolated or buffered by management or marketing from direct interaction with the end-user or customer, and therefore, may not fully appreciate or comprehend the design requirements as anticipated by the end-user. Also, when software development spans the term of many months or years, design requirements may change as marketplace trends change the end-users' business needs. If the design of the software application is unable to respond to business dynamics, then the software application becomes obsolete.

Furthermore, end-users may not entirely conceptualize or visualize the desired software application end-product or, even more disastrously, necessary design requirements may not even materialize or emerge until testing, integration, or delivery of the software application. As is frequently the case, custom application end-users do not or can not adequately express the desired "look-and-feel" or functionality of the desired custom application software until they first see a version of the "final" product. At such a juncture, an end-user is generally more capable of expressing negative preferences by enumerating aspects of the "final" version that they prefer to be different. If at such a juncture, as is typically the case, substantial resources have been invested in the "final" version, then the end-user must choose either to tolerate a less than ideal "final" version of the product or to invest yet additional resources (i.e., time and money) into conforming the "final" version with newly-discovered or poorly-communicated preferences.

In addition to communication breakdowns, quality variations are frequently introduced into software applications through inherent capability variations of software programmers. For example, some software application programmers may be less oriented to details and thereby inject defects or bugs into the software application that directly affect quality. Yet other programmers may personally stylize their software components thereby becoming functionally and visually inconsistent with other portions of the software application resulting in an inconsistent look-and-feel to the software application. Such personalized inconsistencies may affect perceived and actual quality and performance.

With respect to complex software application design and development, as hardware processing power economically increases, new software applications become increasingly more complex and sophisticated thereby antiquating older software applications. As a result, traditional software application design and programming techniques provide less predictable and protracted results at an increasingly unacceptable level of cost and associated development risk.

Accordingly, what is needed is a method and system for automatic or highly automated creation of complex database software applications without exhaustive, traditional, detailed programming. Automated creation of complex software applications without the associated inconsistencies and quality variations resulting from programmer variation, facilitates implementation or prototyping of complex software applications in an expedient manner relative to traditional programming philosophies. Automated creation of software applications permits an application designer to prototype custom software applications in relatively little time, thus producing a nearly final version of the custom software application for immediate review by an end-user. Additionally, automated creation of software allows the application designer to expediently incorporate feedback, both likes and dislikes, into subsequent iterations of the software application that incorporate revised preferences.

SUMMARY AND OBJECTS OF THE INVENTION

It is an object of the present invention to provide a method for computer-assisted database management software creation of a target software application from a universal software application for interaction with an application database.

It is another object of the present invention to provide a system for computer-assisted creation of a target software application for database management of an application database.

It is a further object of the present invention to provide a method for designing a target software application capable of interaction with a database by describing the target application at a high-level of discourse and automatically creating the target software application with the assistance of a computer after such discourse.

It is yet another object of the present invention to provide an application editor for interactively capturing the high-level discourse describing the target application.

Additional objects and advantages of the invention will be set forth in the description that follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method, system, and computer program product for automatic or highly-automated creation of database application software is provided. The system and method of the present invention can be used for creation of virtually any type of custom software applications that interface with an application database.

The system and method of the present invention facilitates the creation of mission-critical software applications by facilitating a high-level dialog describing the desired or target software application. The computer stores a description of the target application that serves to customize a re-usable universal application for interaction with an application database.

A target or custom software application is created by employing a development process employing both technology as described below and a process development methodology wherein the target application is developed during a development application stage, deployed in a packetized or commercially marketable application product in a deploy product application stage, and supported in a support application stage. Such stages are organized as an evolutionary cycle thereby providing for the constant evolution of a customer's target application and thereby reducing or eliminating the obsolescence factor associated with traditional customer-specific target applications. Each of the above-described stages is comprised of a set of interrelated phases having specific deliverable products throughout the stage. Each of the specified deliverable products provides a valuable function in the target application development process for exposing and extracting customer requirements, formalizing the discovered requirements, demonstrating the capability of the underlying architecture of the target application, and incorporating enhancements into the target application.

A custom software application is created in the present invention from a high-level dialog carried out between an application designer and a graphical application editor. It should be pointed out that because of the high-level of discourse carried out between an application designer and the application editor, that the application designer need not have most of the detailed skills of a computer programmer. As used herein, the finished custom software application or target application bears all resemblance both functionally and aesthetically to a manually programmed custom software application as traditionally created in industry.

In the present invention, a custom target software application provides for a user interface and data manipulation of data contained within an application database. The application database with which the target application interacts may exist prior to the creation of the target application or may be concurrently created or structured with the creation of the target application.

To facilitate the high-level dialog between the application designer and the computer, an application editor executing on a computer is provided. The application editor provides an environment for editing and creating custom applications thereby accommodating the prototyping of a new application, such as the target application, by creating a specification, hereinafter called a "dictionary." The dictionary comprises descriptions of transactions and groupings of "sets" of data from the application database. The sets of data form the basis for the transactions, reports, analyses, and other components of the application. A dictionary provides the customized behavioral description that distinguishes one custom or target application from others.

The dictionary also includes a description of transactions or operations to be performed on the application database. A group of one or more transactions that are presented concurrently to an end-user form a "view" of the data. Views of data may be related in hierarchy such as parent, child, sibling, and grandchild views of data without limitation. Groupings of related views form a set of data.

The universal application takes the form of a generic application having functional objects or modules that assume customized appearances and functionality upon deriving their customized identity from the target application-specific dictionary. The dictionary and universal application acting in concert constitute the custom target application. The universal application is comprised of a rich set of application components that in conjunction with the target software-specific dictionary customize the execution of the target application. The universal application may be partitioned into client and server processes or portions.

The present invention allows an application designer, as opposed to a computer programmer, to describe the target application in a top-down design method. For example, an application designer uniquely identifies a target application to the application editor that in turn creates the database containing the target application's dictionary.

Secondly, security features are incorporated into the target application including assigning responsibilities and identifying users and assigning users to one or more responsibilities. Target application users are partitioned by responsibilities with each responsibility presenting menu structures unique and fully navigable by users assigned therein. Next, a menu hierarchy is described providing the navigational capability within the target application.

For target applications that do not have an existing application database upon which to operate, the present invention provides an interactive environment in which to define a schema and construct a physical database. The application editor allows the application designer to define table columns and other related database details.

Groups of data, upon which related transactions operate, are collectively defined and mapped from logical levels to the physical database data elements. This step defines a set as a list of fields and their relationships. To create sets, an application designer creates information within the dictionary containing the description of the set definitions. A set may contain one or more views that are based on corresponding relational database tables. In the present invention, the concept of "sets" allows an application designer to define all the data on which the target application will possibly operate. The universal application then automatically creates the SQL code necessary for manipulating the application database for interaction with the data contained within the sets.

Finally, transactions, reports, analyses, and server programs are created for maintaining and operating upon data within the application database. In the present invention, the application editor provides a menu and graphical user interface environment for configuring and defining transactions, reports, analyses, and server programs. A transaction may allow a user to enter a data value for storage within the database, manipulate existing data in a database, retrieve and present data from a database to an end-user, or perform the previous functions without presenting information to an end-user. A report may allow a user to retrieve application-specific information from the database, manipulate it, and present it to an end-user interactively, print it, or otherwise distribute it electronically to other end-users. An analysis may allow a user to enter options that identify the data within the database that the user would like to analyze, manipulate that data interactively by stepping up or down a data hierarchy, looking at the data in different dimensions, drilling down into the data, rotating analysis axes, and duplicating the analysis for side-by-side comparison. A server program may computationally operate upon data within the database, upon data that a user is entering interactively, or upon data that is being provided to the application electronically from another application or across a communications network from and information supplier.

Execution of the target application from an end-user workstation proceeds consistently with execution of any other custom application. At the operating system level, an icon designating a previously defined target application is presented to an end-user. The end-user then selects and launches the target application which initiates a "client" portion of the universal application resident on the end-user workstation, terminal, or computer. The client process receives the directive to employ the specified target application's dictionary for obtaining customized behavioral directives for the universal application. The menus with corresponding transactions are then presented to the end-user as previously defined through the use of the application editor in the dictionary.

When specific transactions, reports, analyses, or server programs are selected for modification of or operation on the application database, the universal application creates the appropriate SQL for interrogation of the application database. As the dictionary is also implemented as a database, information is also accessed and exchanged with the dictionary through the use of SQL commands automatically created by the universal application.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 7 is a simplified block diagram of the components of a universal application, in accordance with an embodiment of the present invention;

DETAILED DESCRIPTION OF THE PREFERRED EMBODIMENTS

As used herein, the term "prototype" refers to the process of creating a software program or software module, or portions thereof. Prototype software may take the form of an intermediately refined target software program or a finalized deliverable target software application.

As used herein, the term "universal application" refers to a software module capable of manifesting customized or target software applications by referencing an application-specific file, hereafter termed a "dictionary." The universal application may be partitioned into a client/server arrangement wherein a portion of the universal application may reside in a client environment while other portions reside in a server domain.

Figure 1:
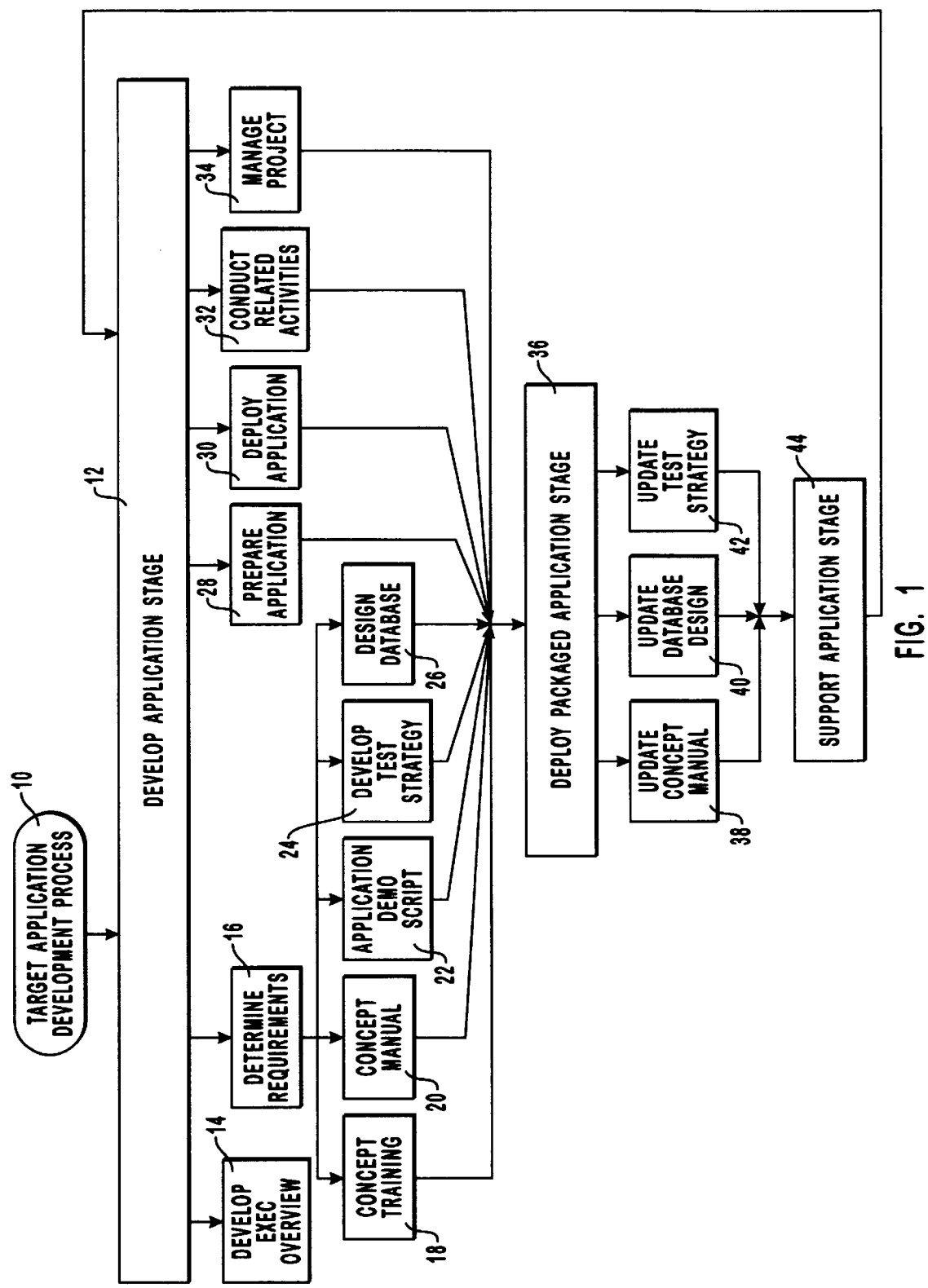
FIG. 1 is a simplified flowchart illustrating the development process for a target application, in accordance with an embodiment of the present invention.

FIG. 1 is a simplified flow chart depicting a re-engineered methodology for software development and deployment, in accordance with the present invention. Traditional software development has been plagued by continued miscalculation of both scheduling and costs associated with development of a target application. The present invention employs both technology and methodology for shifting the paradigm of target application software implementation. Such a paradigm shift transitions a software development schedule targeted for several years to software development schedule spanning four to eight months. In order to shift such a software development paradigm, the present methodology relies upon at least three methodological parameters. First, the present invention reduces risks associated with software development by shortening the cycle time necessary for software development. By reducing the duration of the project, risks associated with changing business needs or capabilities such as funding may be reduced or even eliminated. Secondly, the present invention through the use of the technology described below is capable of generating an initial version of the target application in a very short period of time, thus facilitating an iterative approach for enhancement of the target application according to target application users' preferences. Such iterative approaches have been shown to provide greater customer satisfaction in the final version of the target application primarily due to the timely interaction with the user during enhancement of the target application. Thirdly, the target application development methodology of the present invention finalizes, or productizes the target application into a refined form such that (i) the target application user or customer receives a higher quality solution, (ii) the application has a longer life cycle, (iii) components of the target application may be reused for yet other target applications and (iv) the target application may be marketed to other customers.

Such a development methodology provides a start to finish evolutionary life cycle for target applications and productized target applications for subsequent reuse and resale. The design methodology of the present invention may be partitioned into three distinct stages as depicted in FIG. 1. Each stage has a set of interrelated phases including activities assigned to either or both the application designer and target application user. The present methodology when combined with the technology described below provide an inventive approach to software implementation. FIG. 1 depicts a target application development process 10 which provides an evolutionary life cycle for the implementation of target applications and productized target applications. Target application process 10 is comprised of three distinct stages, a develop application stage 12, a deploy packaged application stage 36, and a support application stage 44.

Develop application stage 12 comprises the activities or steps necessary for determining the requirements of a target application, preparing the target application, and deploying the target application. Develop application stage 12 is the first stage for the implementation of new target applications, although the implementation process is cyclical in traversing the three stages. A develop executive overview stage 14 is the first phase of develop application stage 12 and comprises the steps of: (i) defining the scope of the target application and clarifying and monitoring milestones such as a clear identification of the business need, (ii) demonstrating the technology, (iii) generating a formal executive overview document, and (iv) presenting a project proposal including cost and schedule. The executive overview document defines clearly the scope of the target application and may involve extensive interaction with the user in order to accurately depict the scope of the target application.

The second phase within develop application stage 12 is a determine requirements phase 16 for developing a very specific description of the ultimate implementation of the target application. Determining requirements phase 16 relies upon the scope of requirements contained within the executive overview developed within develop executive overview phase 14. Determine requirements phase 16 further defines the goals and describes the target processes for each functional and technical component of the target application. The fundamental purpose of capturing such information is to maximize the usability of all software generated by ensuring that portions of the target application are not created until the target application is fully described.

Determine requirements phase 16 is further comprised of a concept training phase 18, a concept manual phase 20, an application demonstration script phase 22, a develop test strategy phase 24, and a design database phase 26. A concept training phase 18 signifies the first major deliverable product of determine requirements phase 16. Concept manual phase 20 provides a documented version of the detailed capabilities of the target application. This second major deliverable product enumerates target application components such as business functions, support functions, transactions, smart codes, menus, reports, responsibilities, servers, and analyses as described below. It should be noted that other activities also commence during concepts manual phase 20 such as design database phase 26 and develop test strategy 24. Application demonstration script phase 22 describes a demonstration that ultimately becomes an effective tool to convey compelling features and functionality of the target application. This third deliverable product within determine requirements phase 16 is a demonstration script that may be cross checked with the capability descriptions generated in concept manual phase 20. Develop test strategy phase 24 defines unique interrelated tests that insure the functional compliance, continuing stability, and integrity of the target application. The user or customer of the target application provides sample scenario and data including representative operational inputs and outputs for use in the development of regression tests that are to be used in verifying consistent functionality of the target application through the development and deployment processes. Design database phase 26, in the preferred embodiment, employs entity-relationship modeling techniques to describe the major groupings of data and the interrelationships to produce a logical database model. Although many target applications require integration with existing application databases, design database phase 26 provides insight into management and maintenance considerations within a normalized database.

A prepare application phase 28, the third major phase within develop application stage 12, provides a phase wherein the target application is developed from the definitions captured in the previous determine requirements phase 16. In this phase, the target application is prepared using the architecture described below that facilitates the timely creation of the target application. Within prepare application phase 28, menus, sets, transactions, server programs, and analyses are generated that support the underlying transactions within the target application. The concept of menus, sets, transactions, server programs, and analyses are set forth in detail within the description and figures that follow.

A conduct related activities phase 32 is carried out concurrent with prepare application phase 28. Conduct related activities phase 32 is performed nearly exclusively by the user of the target application. Within conduct related activities phase 32, the target application user prepares the environment within which the target application will be deployed. Such preparation includes defining user roles and responsibilities, procuring development hardware and software, reviewing and approving deliverable products, validating business processes, establishing technical infrastructure to support the target application, and accessing the business culture for determining how best to implant the target application into the business functions.

Manage project phase 34, carried out concurrently with the previous phases, provides a mechanism for defining the purpose of the project, developing a project charter, defining the roles and responsibilities of each team member, reviewing and scheduling of the project tasks, reporting project status, and the monitoring of the progress and dependencies associated with each phase.

A deploy package application stage 36 is the second stage within target application development process 10. Deploy package application stage 36 prepares and deploys the target application for release. In such a stage, a target application is "productized" thus transforming a development-environment target application into a packaged target application. Deploy package application stage 36 is comprised of an update concept manual phase 38, an update database design phase 40, and an update test strategy 42.

A support application stage 44 provides for ongoing assistance to users of productized target applications. It should be pointed out that support application stage 44 reverts back to develop application stage 12 for incorporation of functionality and features derived from support application stage 44.

Target application development process 10 facilitates the creation of sophisticated target applications within a substantially reduced amount of time when developed using the above-described development process in conjunction with the below-described architecture for developing target applications.

Figure 2:
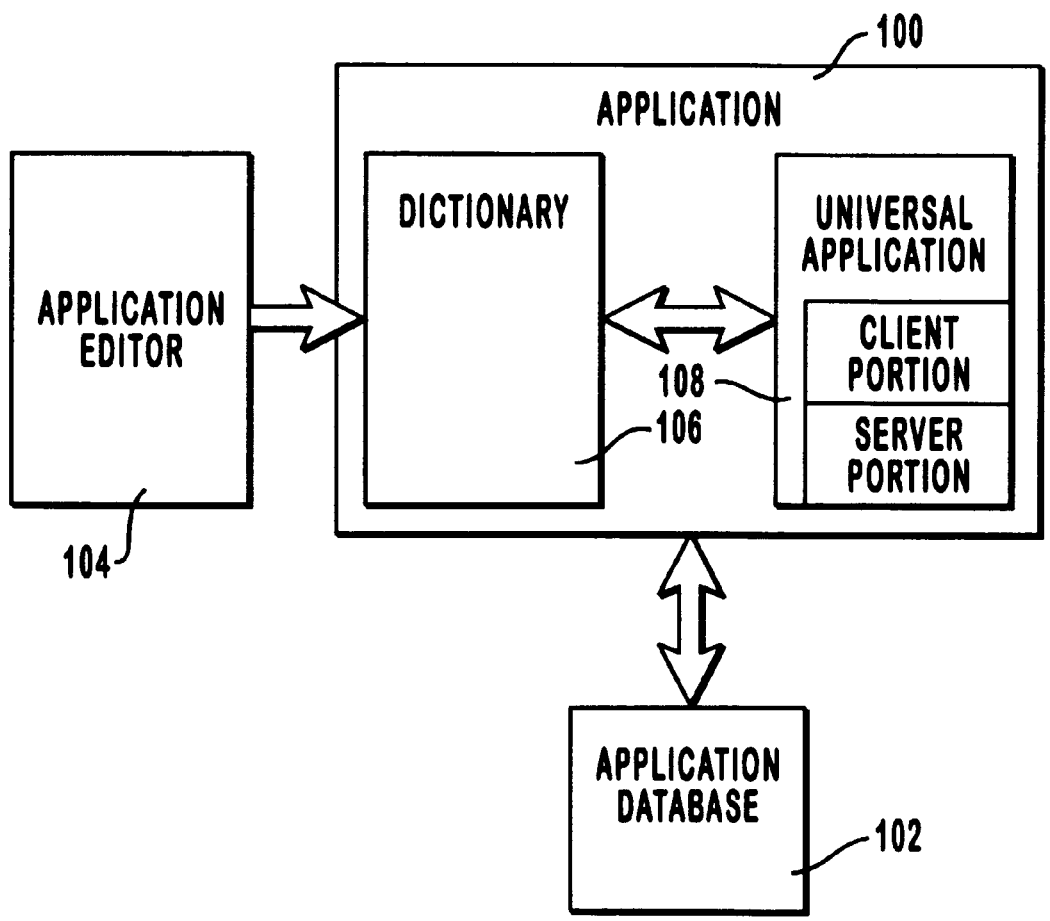
FIG. 2 is a high-level block diagram of an exemplary system for automating the creation of a target database-based software application, in accordance with a preferred embodiment of the present invention.

FIG. 2 is a simplified, high-level block diagram of the software components utilized in carrying out the present invention. A custom target software application 100 provides capabilities including a user interface and data manipulation of data contained within an application database 102. Complex, mission critical business applications typically contain large numbers of on-line transactions, server-based transactions, reports, analyses, and server programs each of which provides considerable functionality. Database 102 may exist prior to the creation of target application 100 or may be co-created or structured concurrently with the creation of target application 100.

An application editor 104 facilitates the prototyping of a new application such as target application 100 by creating a specification comprising descriptions of transactions, reports, analyses, server programs, and grouping of "sets" of data from database 102 that form the basis for such transactions, reports, analyses, and server programs. In the present invention, prototyping means quickly building a complete, running application with minimal programming if any. Prototyping also implies running or executing an application, testing the application to verify its correct behavior, observing such an application in action, and identifying preferences of functionality for incorporation or modification in a subsequent revision.

Target application 100 is comprised of a dictionary 106 acting in concert with a universal application 108. Dictionary 106 is constructed using an application editor 104 to describe the custom characteristics of target application 100. Dictionary 106, in the preferred embodiment, takes the form of a database functioning as a repository for storing an application specification. Transactions, describing operations on data, operate on data from one or more database tables and present to an end-user a "view" of the data. Views of data, in the preferred embodiment, are organized in parent, child, sibling, grandchild, et cetera hierarchy without limitation and form sets of data as further described in FIG. 3. In the preferred embodiment, application editor 104 is itself a target application 100 created recursively and operating as described in this paragraph.

Universal application 108 is comprised of a rich set of application components (FIG. 7) that, when described for a particular application in dictionary 106, customize the execution of target application 100. Universal application 108 "manifests" to the end-user custom target application 100 as described by dictionary 106. As shown in FIG. 2, universal application 108 may be comprised of client and server portions. The partitioning of functionality of universal application 108 between the client and server portions varies according to the specific operating environment of application 100. For example, in operating environments such as a local area network, if network access is congested or restricted due to high-volume traffic or inadequate resources, performance may improve if additional functionality is distributed to the server portion thus alleviating additional transfers of data between the database resources (e.g., server) and a client (e.g., end-user workstation). It should also be noted that both the client and server portions may co-exist with database 102 on the same physical hardware such as a computer. Additionally, dictionary 106 may also co-exist with database 102 on the same physical hardware such as a computer.

To prototype an application, an application designer using application editor 104 describes the target application by describing a menu structure that terminates in the execution of a transaction upon a definable group of data, known as a set. "Views" of the data are presented to an end-user via a presentation vehicle described as one or more "frames". In the present invention, prototyping, by its very nature, may be an iterative process. By facilitating the timely creation of a prototype target application, preferences in improvements may be more immediately noted and acted upon.

When an application designer begins drafting application 100, the application designer must describe the anticipated application database 102 in dictionary 106 using application editor 104. If an existing application database 102 is to be incorporated, then application editor 104 supports automated reverse engineering of the existing database information directly into dictionary 106. If the application designer is also designing application database 102 as part of target application 100, the application designer uses application editor 104 to describe that database. Once described in dictionary 106, application editor 104 supports automated forward engineering of the desired target application database 102 by defining and creating the relational database schema.

Figure 3:
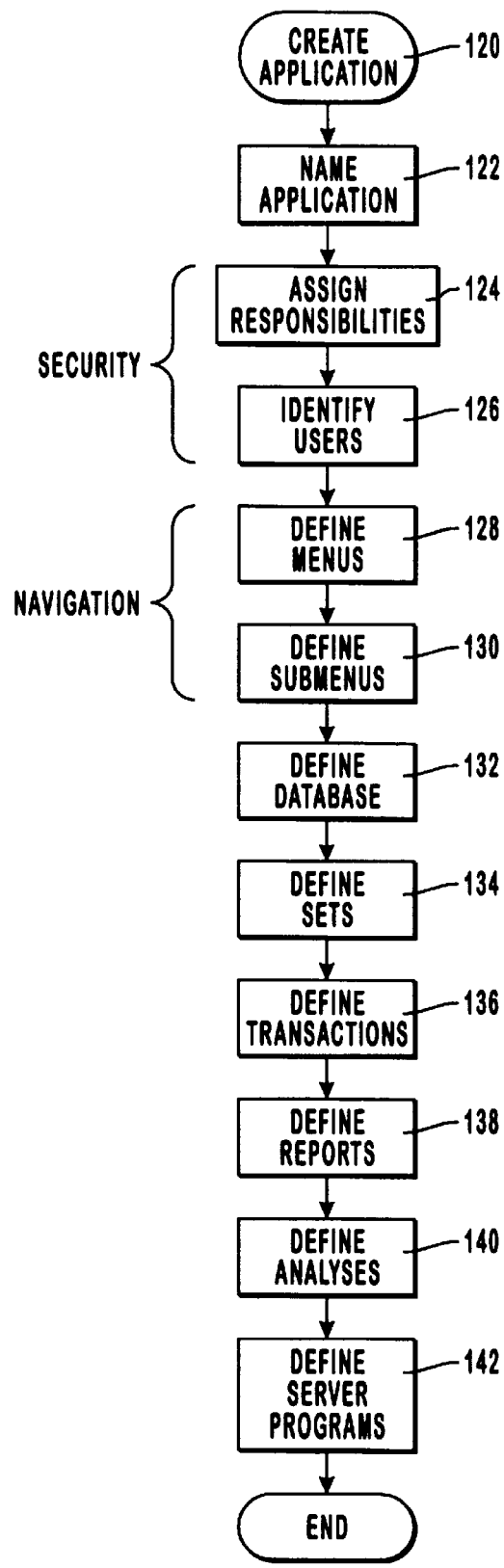
FIG. 3 is a simplified flowchart illustrating the method for creating a target database-based software application, in accordance with a preferred embodiment of the present invention.

FIG. 3 is a simplified flowchart for creating a custom target application, in accordance with the preferred embodiment of the present invention. Target application 100 (FIG. 2) is created using application editor 104 (FIG. 2) as further detailed in FIG. 5. Briefly, application editor 104 provides an environment for editing and creating custom applications.

Within application editor 104, create application process 120 commences with a name application step 122 which uniquely identifies the target application. In the preferred embodiment, application editor 104 (FIG. 5) provides a graphical interface for conveniently carrying out name application step 122 by creating a separate dictionary 106 or a logical area within an existing dictionary 106 wherein descriptions including transaction and set definitions of the target application are stored for future modification by the application editor 104 or by future use by the universal application 108.

The present invention incorporates security features comprising an assign responsibility step 124 and an identify user step 126. Assign responsibility step 124 allows the application designer to partition access or execution portions of the target application between segregated classifications of users. For example, a target application directed toward a sales and marketing application, may include definable user responsibilities such as salesman, sales management, corporate management, and system administrator. In identify users step 126, specific end-users are assigned access to certain responsibilities and end-users are thereby not confused by later seeing on their menu a superset of transactions, a portion of which may exceed the privileges of a particular user. Additionally, by associating transactions to responsibilities, transactions not available to a particular user are concealed from that user.

In the present invention, the target application employs a menu structure for navigating between different menu levels and transactions within the target application. A define menu step 128 defines and establishes relationships among the target application's main menu entries. A define submenus step 130 creates submenus or child menus in main menu entries. wherein responsibilities map to menus and submenus which are then presented equally to all users within a responsibility classification. Furthermore, in the preferred embodiment, menus and submenus may be coarsely defined during the preliminary phases of application development thus allowing a top-down design of the target application. Additionally, in the preferred embodiment the concept of responsibilities, menus, and submenus is sufficiently abstract to allow for various means of visually displaying what amounts to a technique for identifying the user's business purpose for using target application 104 (responsibility), for identifying the tasks available to the user (menus), and for identifying subtasks available to the user (submenus).

A define database step 132 allows an application designer to describe an application database for utilization by the target application. Define database step 132 allows the user to define table columns for a logical database and enumerate column names and other related database details. Entities and attributes in the application database may be divided into logical groupings for incorporation into tables. In the present invention, application databases may be prototyped or created from a high-level dialog and include physical tables with corresponding columns and constraints. In define database step 132 an application designer defines within application editor 104 (FIG. 5) the tables within the application database to be used in building transactions and the sets of data to be operated upon by the transactions. Define database step 132 further maps between a physical database layer and a logical mapping layer for use in defining transactions and sets. (See FIG. 8).

A define set step 134 defines a set or a collection of data elements for use in transaction, reporting, analysis, or server program steps. In the preferred embodiment, create sets step 134 defines a set as a list of fields (columns) and their relationships. To create sets, an application designer employs application editor 104 (FIG. 2) to create information within dictionary 106 containing the description of the set definitions. Create set step 134 defines and refines a set applications object in dictionary 106. Create set step 134 allows the definition of sets for use in building transactions, reports, analyses, and server programs. By employing sets, an application designer may maintain a top-down design of application objects used in transactions, reports, analyses, and server programs. A set may contain one or more views that are based on corresponding relational database tables. Additionally, an application designer may specify a set by basing that set on an already-defined set thereby invoking the principle of inheritance. Inheritance implies inheriting all the attributes of an existing set in the new set without having to specify again those attributes.

Relational databases store data in tables that are convenient for rapid storage, update, and retrieval. Relational database designers urge "normalization" of a table to minimize data storage and to maximized data flexibility. For example, if a purchase order is stored in a relational database, the data would be normalized for a single purchase order by adding rows in multiple tables, one row in a header table, vendor table, purchasing order line items, etc. Since data is distributed across multiple tables, the target application operates on "sets" of data, where a set consists of all the data on which operation is desired. Therefore, a set is an association of data in a form convenient for application processing.

Figure 4:
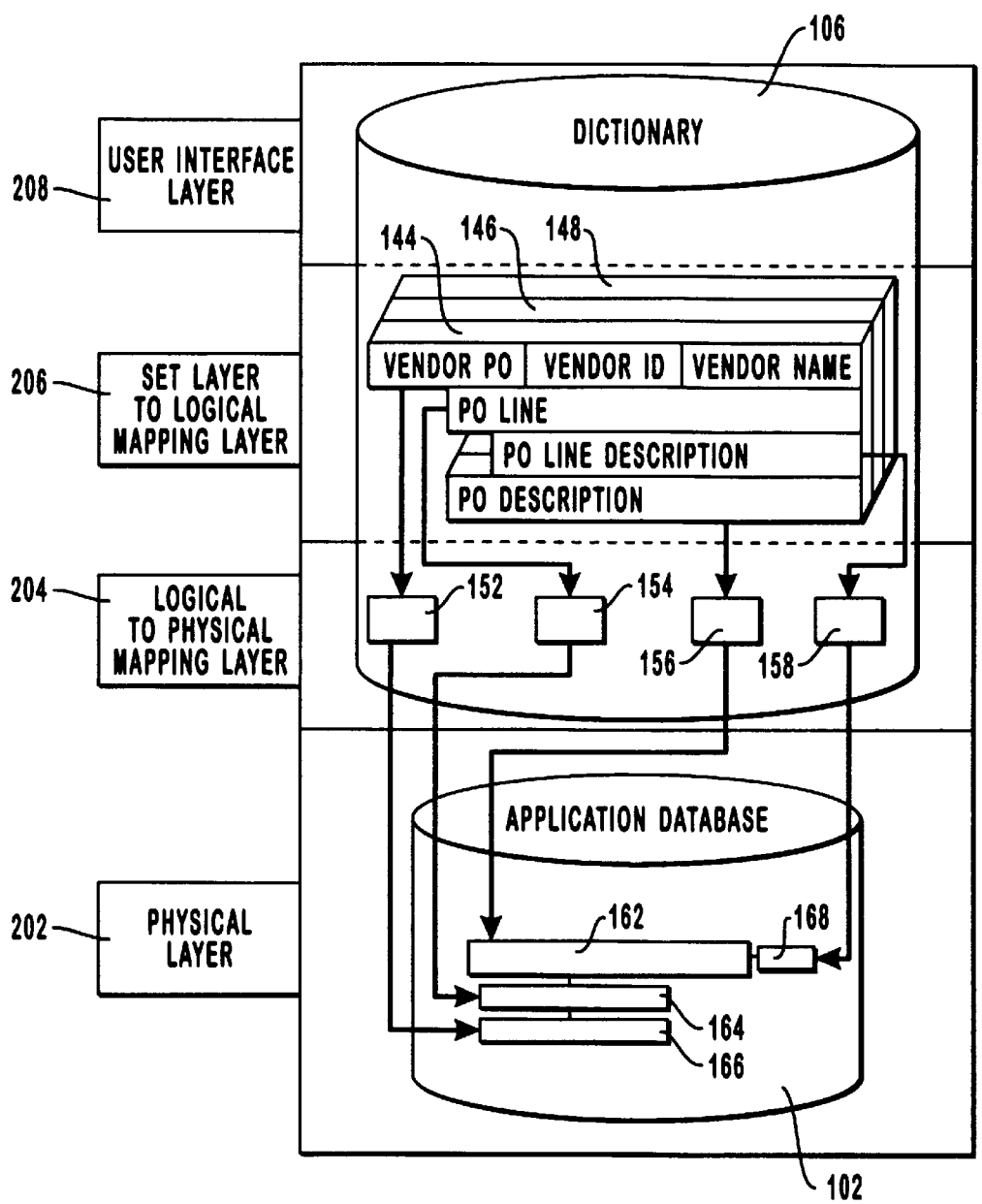
FIG. 4 is a simplified diagram of the mapping of a set layer of the present invention to a physical database schema of an application database, in accordance with a preferred embodiment of the present invention.

Referring to FIG. 4 for a simplified diagram of the mapping of a set layer of the present invention to a physical database schema of an application database, sets may be thought of figuratively as business objects for collecting data that possess a defined group of relationships. A vendor PO set 144 is defined within set layer to logical mapping layer 206 and is comprised of a vendor ID, vendor name, PO line, PO line description, and PO description. Instances 146 and 148 also are comprised of the same elements as vendor PO set 144, however, instances 146 and 148 map to different physical purchase orders. The present invention, therefore, facilitates defining relationships as a set entity, such as vendor PO, and thereafter allows the user to reference or query using the set designator. For example, in the present invention, a user may query for PO #1 with the architecture of the present invention referencing the set definition and extracting the corresponding data from application database 102. By facilitating the definition of relationships into sets, the present invention provides an abstraction of a user interface layer 208 from a physical layer 202 Additionally, such capability facilitates interfacing a new target application with a legacy application database.

A logical to physical mapping layer 204 provides a mapping of sets to the physical application database elements 162, 164, 166 and 168 through views 152, 154, 156 and 158. While a set is a collection of one or more views, a set also knows about the relationship between views. For example, a set Purchase Order may contain views called PO Header, PO Detail Lines, PO Detail Lines Description, and PO Description. Views contain records which are instances of views. In the immediate example, there is one PO Header record and multiple PO Detail Lines, PO Detail Lines Description, and PO Description records in Purchase Order. Furthermore, records and views contain fields. In the immediate example, PO Header may contain fields such as Amount, Ship To Address, etc. In searching for purchase orders from a specific company, an instance of the set Purchase Orders would be returned for each purchase order in the database. In the present invention, the concept of sets allows an application designer to define all the data on which the target application will possibly operate. The database library 238 (FIG. 7) automatically creates SQL necessary for manipulating application database 102 (FIG. 2).

Figure 5:
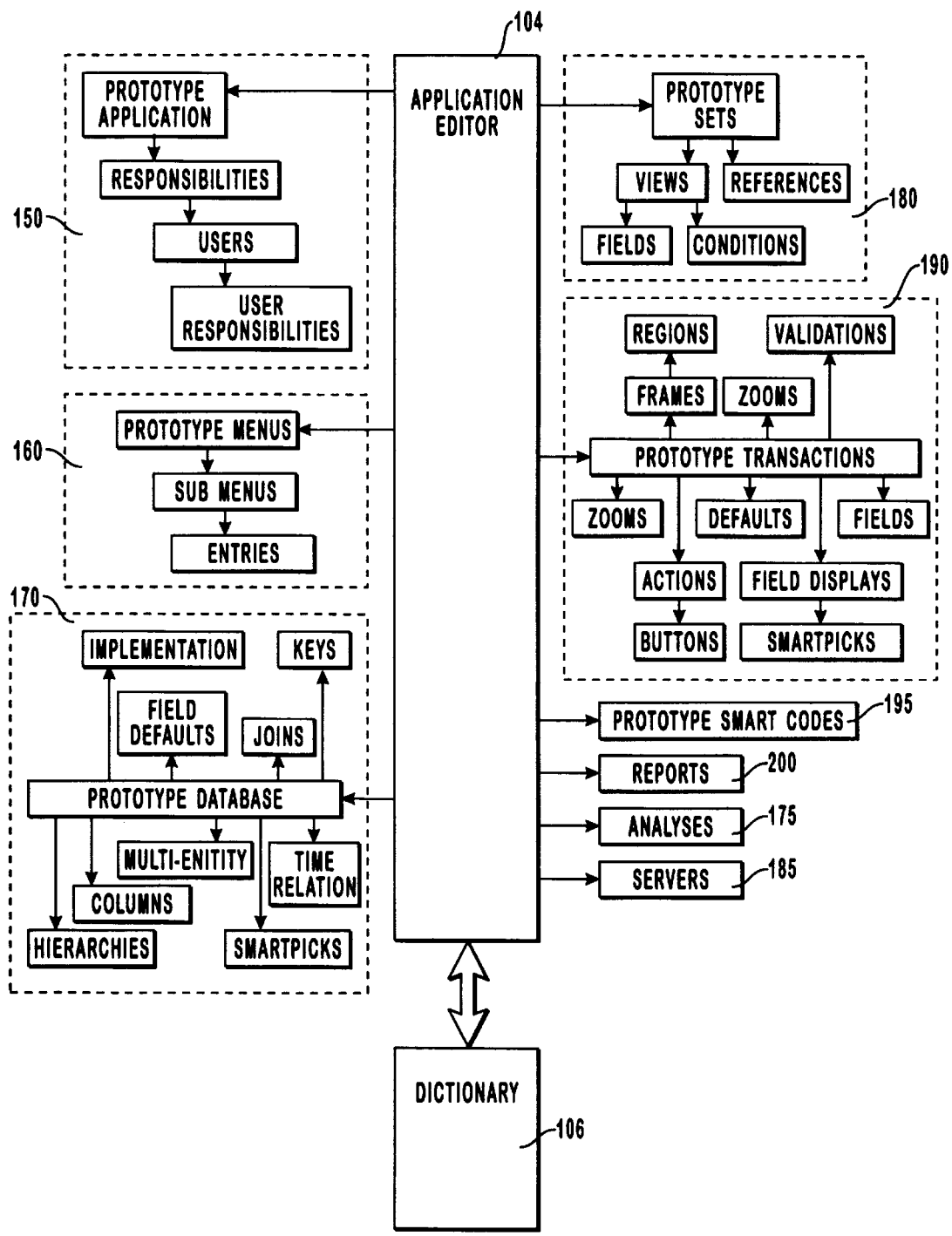
FIG. 5 is a simplified block diagram representing the components of an application editor for creating a target database-based software application, in accordance with a preferred embodiment of the present invention.

Returning to FIG. 3, a define transaction step 136 captures and maintains information about a specific relationship or collection of information. In the preferred embodiment, application editor 104 provides a graphical user interface environment for configuring and defining transactions. A transaction may query a user to enter a data value for storage within the database, manipulate existing data in a database, retrieve and present data from a database to a user, or perform the previous functions without presenting information to a user. Additionally, a transaction may invoke a variety of business rules that an application developer can describe as snippets (FIG. 5).

A define reports step 138 captures and maintains information about a specific report. In the preferred embodiment, application editor 104 provides a graphical user interface environment for configuring and defining reports. A user may request a report when needed or on some recurring schedule that in the preferred embodiment is produced on a server. Additional capabilities of the universal application 108 let a user direct report output to a specific printer, review report output on their client workstation, print the report after review, delete it after review, send the report to other users, group report requests together so that the user can obtain multiple reports such as their end-of-month reports with a single request, and maintain the definition of a report group. Additionally, all report requests support flexible options such as date ranges for the data included in the report. In the preferred embodiment, reports can also be defined using a higher-level language description for specifying the report description.

A define analyses step 140 captures and maintains information about a specific analysis. In the preferred embodiment, application editor 104 provides a graphical user interface environment for configuring and defining analyses. An analysis queries considerable data from application database 102 and presents this data for interactive manipulation for the purpose of data analysis and decision support. To facilitate data analysis, a user can sort the data ascending or descending, step up or down through various levels of summary information, see the data alternatingly in any two of three dimensions for analysis, drill down to see the details behind any total, look at multiple attributes of the data, copy an analysis for side-by-side visual analysis, transfer analysis information into an industry-standard spreadsheet, or print the analysis.

A define server programs step 142 captures and maintains information about a specific server program. In the preferred embodiment, application editor 104 provides a graphical user interface environment for configuring and defining server programs. A server program typically runs on a server and performs some business function interactively as part of a transaction or on a schedule or upon request on some set of data from the application database 102.

FIG. 5 is a simplified block diagram of application editor 104 with its associated software transactions utilized in creating a custom target application, in accordance with the preferred embodiment of the present invention. In the preferred embodiment, application editor 104 itself is an application that was created from a dictionary 106 (FIG. 2) and universal application 108 (FIG. 2). Application editor 104 is an application employed to create and maintain dictionary 106 which contains information descriptive of the target application. Application editor 104 permits an application designer to enter application designs in a top-down fashion such that application objects not yet defined may be referenced in higher blocks.

As briefly introduced above, a prototype application transaction 150 permits naming or defining a new application or referencing of an existing application according to a previously defined application name. In the preferred embodiment, an application designer logs into the application editor and selects the prototype application transaction 150 via a menu driven interface. The application designer may provide a name for a new application or may supply the name of an existing application for editing purposes. As briefly introduced above, prototype application transaction 150 is comprised of a partitioning-of-responsibility step followed by assigning users to the various previously defined responsibilities. It should be noted that during development, in the preferred embodiment, application designers are automatically assigned all of the responsibilities defined in the application thus enabling the designer to build and test each transaction associated with the defined responsibilities. In the preferred embodiment, a software driven menu window is presented to the application designer for entering a suite of responsibilities associated with the application under development. Such responsibilities may be ordered on the window by associating a sequence number such as a presentation ordering number with each of the responsibilities.

A prototype menus transaction 160 is employed by application editor 104 to define menus and submenus associated with the application under development. Prototype menus transaction 160 defines and updates menu applications objects resident within dictionary 106. In the preferred embodiment, prototype menus transaction 160 is presented in a software driven window accommodating the entry of a unique name of the menu which is attached to a previously defined responsibility. Yet another field in the prototype menus transaction window enables a menu to be assigned to another menu for use in creating submenus. In the preferred embodiment, an entries module also forms a portion of the prototype menus transaction 160 and defines submenus and transactions or other types of processes in a menu. In the preferred embodiment, a prototype menus entries window allows the name of the menu to be entered followed by one or more menu entries indicating menu options. The order of these menu options may also be selected by providing an order number as a sequencing number for the presentation of the menu entries. By way of example, other fields may be incorporated such as hot keys and separate text fields for providing isolated prompts.

A prototype database transaction 170 accommodates a definition and refinement of a table application object in dictionary 106. Prototype database transaction 170 facilitates the definition of database tables that may be referenced when a set is defined. In the preferred embodiment, prototype database transaction 170 is presented by application editor 104 via an interactive window wherein various attributes of a table may be viewed and updated. Additionally, prototype database transaction 170 permits a top-down design of a table applications object via the interactive window environment. Prototype database transaction 170 provides a convenient environment for defining a table by providing table names and describing the basic components of the table. Such ease of interaction permits rapid prototyping via an intuitive environment. Also, in the preferred embodiment, prototype database transaction 170 provides an intuitive environment for database development. For example, a columns module permits the easy description of tables and columns by providing data entry boxes such as table name, sequence number for the column, column name, data type for the column, length of the column in characters, case sensitivity of the column, decimal formatting for a numeric column, data entry required flag, allow change flag, force default value, and description about the column value. Additionally, a hierarchies module allows related data to be grouped together for more efficient use of sets. A hierarchy may be comprised of a grouping of sets within a database or by grouping databases together.

Prototype database transaction 170, in the preferred embodiment, also provides an interactive environment for the assignment of both primary and foreign keys to table columns. Additionally, prototype database transaction 170 provides a joins module for linking two or more logical tables within the database. Prototype database transaction 170 also may be used for incorporating time relation information into the database. By providing time relation information, a user may define data in a table that satisfies any or all of the following criteria: 1) effective for a specified period of time, 2) valid for a period of time, 3) actually recorded in the database for a period of time, or 4) combined with other data in other tables based upon date ranges. For example, an effective time relation may be defined using start date and end date columns in a table. In the preferred embodiment, prototype database transaction 170 is also comprised of a table implementation module which describes the physical implementation of the defined database table.

A multi-entity module provides the capability of defining at the application database level what data is going to be included within the applications data for one entity and not within the view of a second entity. Thus, data elements may be within the hierarchy of one user permitting access to the data by that user while denying access by a second entity to the same data due to the data's absence from the second's hierarchy.

A prototype sets transaction 180 facilitates the definition, refinement, and description of sets in dictionary 106. Prototype sets transaction 180 accommodates expedient set definitions for building transactions, frames, reports, analyses, and server programs. In the preferred embodiment, sets may be easily defined according to the structure and contents of a set by providing a set name and describing basic components. Prototype sets transaction 180 facilitates rapid set design by allowing an application designer the flexibility of providing as little or as much detail about the set as desired. Furthermore, prototype sets transaction 180 accommodates changes to a set by providing quick access and refinement of major components of the set.

Prototype sets transaction 180 further comprises a views module for describing one or more views of a set. In the preferred embodiment, a graphical interface for describing a particular view queries the application designer to input a name of the set that is being prototyped, a sequence number or order number for use in differentiating between parent and child views, a view name unique within a set, a basis table that denotes a table that is the basis for the present view, a name of the parent view of the present view, a name of a reference relating the present view to a parent view, and a comment description field. When a new view is defined each field and reference associated with the view may be enumerated or, in the preferred embodiment, a user may use a draft view function which automatically drafts a definition of the present view. The draft view function creates a field and reference for every column and join defined in the views basis table. When defining fields and references, prototype sets transaction 180 makes assumptions on how fields and references should be defined and automatically displays the new fields and references which may be subsequently edited.

Prototype sets transaction 180 further comprises a conditions module for accommodating the definition of a field with different calculation definitions used when specified conditions are satisfied. For example, a condition specifying when the "calculation" value is applied to the field may be entered and when the condition expression evaluates to true, for example, then the field is set to the value of the "calculation" expression. In the preferred embodiment, when a condition is not specified, the field defaults when all other conditions evaluate to false. Prototype sets transaction 180 further comprises a references module for defining relationships similar to joins, however, at a set level rather than at the logical table level of a join.

A prototype transaction transaction 190 defines transactions that use the sets that were previously defined. Application editor 104 allows a set to be defined and a transaction that uses that set to be described. In the present invention, prototype transaction transaction 190 facilitates the description of frames, field display attributes, and field behavior. In the preferred embodiment, prototype transactions transaction 190 provides an interactive interface for describing a transaction by defining an initial state and supplying transaction characteristics for fields in the selected set. Such a transaction may also be used to define one or more frames for the present transaction. When frames are prototyped, application editor 104 displays and arranges the fields on frames using default frame definitions. While prototype transaction transaction 190 facilitates viewing and updating of various attributes of a transaction, other features may be employed to incorporate more major refinements quickly. Prototype transaction transaction 190 further accommodates viewing of an entire transaction.

An actions module defines the portion of transactions that are to be executed, such as tasks or sets of logic that may be executed at given times within a transaction. A buttons module activates actions that are user-initiatable, while actions that are not user-initiatable are activated by a function call within a transaction.

Prototype transactions transaction 190 contains frame design default values for creating transaction frames and displaying fields. By utilizing the default transaction frame conventions, transaction frames within an application provide a homogenous look and feel environment for an application user. Prototype transaction transaction 190 facilitates modifications to the default frame configuration by allowing modifications to be recorded and stored within dictionary 106 for use by universal application 108 (FIG. 2). Additionally, a region is a named collection of fields which permits the grouping of related data for referencing and manipulation.

Prototype transactions transaction 190 also contains a smart picks module for presenting the user with a domain of valid values associated with the field in question as referenced from a smart code table (see prototype smart codes transaction 195 below). For example, if the field under configuration in a transaction corresponds to a state of residency, then the smart pick module references a smart codes table and retrieves the list of valid values as constrained in the smart codes table. An end-user is constrained to enter a value for the field in question occurring within the domain of valid values as presented by the smart pick module. A validation module defines rules for validating fields, either individually or as a group of fields.

A prototype smart codes transaction 195 facilitates the addition of a new smart code transaction which creates a smart code set and may define a new smart pick using the smart code set. By using smart codes, default values may be specified as preferences for use in application creation. Smart codes provide a centralized location for lists of values in a custom target application. Smart codes may generally be thought of as reference data. For example, an application designer may know that one of the fields in a transaction will be a state of residence. A suite of choices may be programmed and provide the constraints for the domain of valid values for a particular column in a table. The application programmer thereby limits the domain of valid choices that an end-user may enter into the database.

A reports transaction 200 provides an automated method of creating reports documents. An application designer determines the fields and data information to be included in the report output and encodes those fields within the report specification. Reports may be automatically created from sets previously designated by prototype sets transaction 180.

An analyses transaction 175 provides a hierarchical method of analyzing sets of data within the present invention. Data may be initially presented in a highly summarized form comprised of increasingly more detailed levels of data. For example, data may be presented in an annual format, wherein the present format may be "drilled-down" or decomposed into quarterly representations of data. Quarterly representations of data may be further decomposed into monthly summaries within the quarter. These monthly summaries may be further decomposed into weeks and days until individual entries or business transactions are listed. Such an analysis tool allows a user to efficiently evaluate trends and anomalies in a time-efficient manner.

A servers transaction 185 provides a means for partitioning portions of an application that may require unique processing such as computationally intense portions or complex algorithmic portions into discrete server programs for executing such logic. Traditional batch programs resemble the server programs of the present invention in that they are both stand-alone programs for executing specific program functions. However, in the present invention, the majority of server programs are drafted or adapted from existing server programs from a component server library. In the present invention, the server programs are typically invoked as a consequence of some transaction activity that occurs either through an end-user action or as a result of the electronic arrival of a transaction from another application or from an information provider.

Figure 6A:
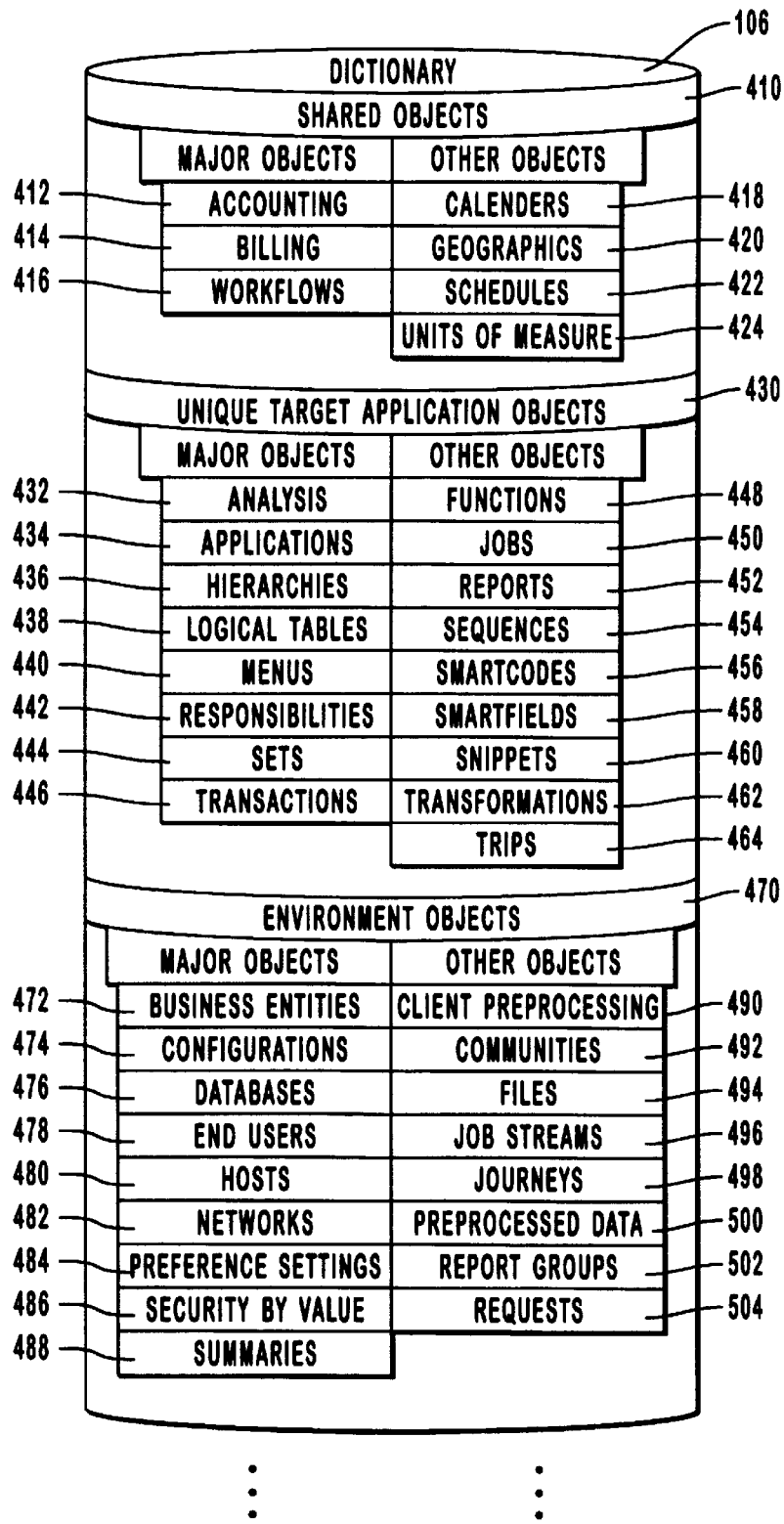
FIG. 6 is a simplified block diagram of components of an application dictionary, in accordance with an embodiment of the present invention.
Figure 6B:
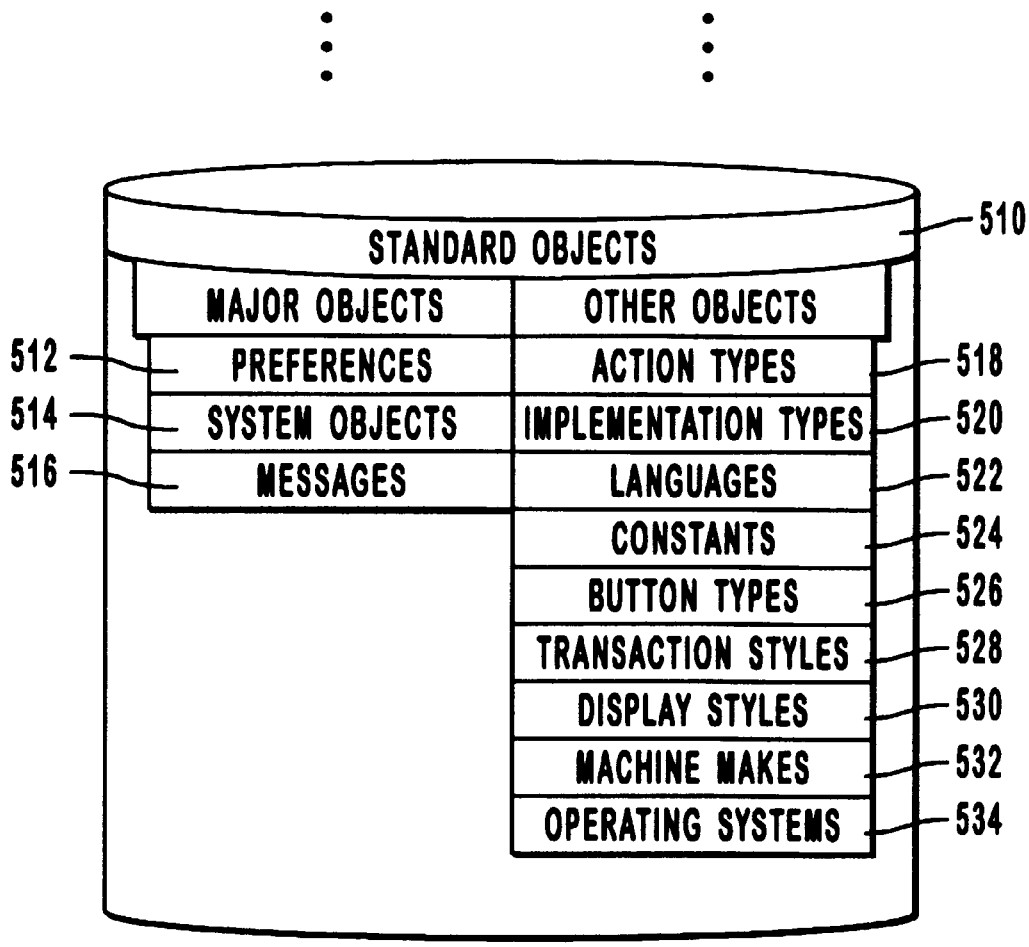

FIG. 6 represents a simplified structural block diagram of a dictionary database, in accordance with an embodiment of the present invention. As briefly described above, dictionary 106, in the preferred embodiment, is a relational database comprised of data describing the structure, components, logic, behavior of the target application, and application objects that contribute to the target application. When universal application 108 (FIG. 2) initiates execution, universal application 108 references dictionary 106 to retrieve the aforementioned descriptions relating to the custom nature of the target application.

Dictionary 106 is partitioned into four major categories of objects: (i) shared objects also known as componentware, (ii) unique target application objects, (iii) environment objects, and (iv) standard objects.

Shared objects 410 are comprised of sub-applications that may be re-used or incorporated into applications that incorporate common functionality. Major objects include an accounting object 412 that provides a general ledger journal entry generator that can operate on any applications database, even if not designed concurrent with the target application. Also, a billing object 414 provides a shared capability to generate and calculate bills and fees. Billing object 414 provides a more elementary object from which a greater understanding of shared objects may be had. For example, one of the functions that a general purpose billing object performs is generating bills. Bill generation requires harvesting data for compilation into bills as well as defining an event that triggers when to initiate the billing process. In billing object 414, part of the object is comprised of a description of the data to be harvested within the application database and a description of the event to trigger the billing object. It should be noted that all of the major shared objects operate similarly. When the billing object executes, billing data is harvested into its own native or billing database which in turn is used to generate the bills.

A workflows object 416 is yet another major object that provides routing directives for data processing. When a process is initiated, workflows object 416 may subject entered data, for example, to a battery of evaluations for determining subsequent processing of the entered data. For example, in the insurance industry when processing an insurance application, the insurance application information may be entered following which the workflows object contains the sequencing for evaluation of the entered information. First, perhaps the amount of requested coverage is evaluated, followed by the credit evaluation of the individual requesting the policy. Branching associated with the policy may also be specified to complete a generally non-interactive flow of data.

Less major objects within shared objects 410 include a calendars object 418 for incorporating time and for the partitioning of time in the target application. Calendars object 18 further permits various methods of dividing and presenting time to be incorporated into a target application. A geographies object 420 provides a predefined structure for unambiguously defining geographic portions of the target application. A schedules object 422 provides the functionality for scheduling activities such as by setting timers for time-activated activities. A units of measure object 424 provides the ability to define different types of units of measure for different purposes, some of which may be absolute units of measure like dozen and others that may be relative.

A unique target application objects 430 category of dictionary objects is comprised of major and minor objects for use by the target application. An analysis object 432 provides a method for "drilling-down" or decomposing a presentation of data as discussed above in analysis 175 of FIG. 5. When an analysis is defined in dictionary 106, a dimension of the analysis is defined according to rows, columns, and pages including the elements that get calculated for each intersection between them.

Other major unique target application objects include an applications object 434 which provides a configuration of the label for the target application and for other applications that are usable by the target application. A hierarchies object 436 provides the functionality for defining a hierarchical relationship and the elements such as parentchild relationships that contribute to the hierarchy. A logical tables object 438 provides a location for the storage of the application database schema that is employed. A menus object 440 provides a name of the menus including a list of submenus and transactions associated with the named menu. A responsibilities object 442 provides the partitioning of menus within a target application. When a responsibility is defined by the application editor, the responsibility corresponds to the top of a menu tree having submenus and transactions. Additionally, the application database is specified to determine on to which application database a user is to sign-on. A sets object 444 provides storage of the defined set elements defined in prototype sets 180 of FIG. 5. A transaction object 446 provides storage defining display information such as regions and frames relating to a transaction.

Less major objects within unique target application objects 430 include a functions object 448 for providing functions that generally include run-time parameters. Functions object 448, in the present invention, is comprised of higher-level language programming rather than lower-level traditional source code programming. A jobs object 450 includes predefined tasks that may be invoked such as a report or other non-user initiated process. A reports object 452 describes the format of the report to be generated upon request. Reports object 452, like many other objects, are written in a higher-level programming language inherent within the present invention. A sequences object 454 is used by logical tables as constructs commonly known as surrogate keys in a database. A smart codes object 456 provides a collection of generally cryptic values corresponding to a more user-friendly value for display. A smart field object 458 provides definitions of structural validations of fields within a database. A snippets object 460 provides function-like capability that may be integrated and initiated as part of a processing flow. A snippet is unnamed in that it is not called or invoked by reference to its identifier but rather is in-line and may therefore be executed within executing processes. A transformation object 462 provides the ability to describe one piece of data to another and also the ability to map, for example, a business application's data into billing data and further into billing events. A trips object 464 enables data from one database to be moved to another database using data mover 230 of FIG. 7.

An environment objects 470 category of dictionary objects is comprised of major and minor objects for use by the target application. Environment objects are objects that tailor a target application to a specific environment. A business entities object 472 provides the capability to divide data by business entity in the application definition by defining business entities and tying them to the target application. A configurations object 474 provides a named collection of dictionary objects. Configuration object 474 behaves similarly to traditional configuration files common to personal computer environments. A databases object 476 provides for the placement of the name for the application database to be referenced by the target application. An end-users object 478 provides a listing of the individual users of the target application. A host object 480 identifies the type of hardware attending to the corresponding target software. Hosts may include client host and a server host. It is essential to incorporate the address of hosts for facilitating functionality such as trips. A networks object 482 provides a description of the interconnections between hosts. A preference settings object 484 provides alterable default values for presenting data to a user. Examples include a time-of-day and display preferences. A security by value object 486 provides security to specified sets of data by restricting access to other users. By way of example, in a sales order system, security by value protection may prevent one salesman from looking at another salesman's customers' orders or other sensitive data. This capability is inherent in the present structure and the imposition of the restrictions does not affect the application design. Such security is imposed upon the data structure when designed and, in the example, only permits a salesman to look at data associated with that salesman's customers. A summaries object 488 allows conclusions of collections of data, such as totals of sales for a month or year, to be generated once and stored for future access by another without having to re-calculate a summary of the requested collection of data. Additional functionality within summaries object 488 requires that totals, for example, be invalidated when data values within the collection change.

Less major objects within environment objects 470 include a client preprocessing object 490 that provides rules for making a client-server environment faster and more efficient at processing large amounts of data. Therefore, values or totals that are frequently requested from a server across a network may be locally cached at the client site and refreshed at the server site when values change. A communities object 492 provides a named collection of hosts for routing of data in a networked installation. A files object 494 provides a mechanism for storing operating system files in the dictionary for purposes of sending them, for example via trips 464, to other systems or for other general purposes. A job streams object 496 provides a named collection of jobs that may be executed via a single request. For example, when a job stream is defined, the order of the jobs and the inter-relationships between the jobs (e.g., time and data dependencies) is specified. A journeys object 498 specifies a list of trips 464 to be performed and may also include time-activation information specifying when the journey is to be invoked. A preprocessed data object 500 resembles client preprocessing 490, however, preprocessed data 500 occurs on the server portion of the configuration where the server may prefetch frequent data, analogous to caching, and make it more readily available to a requesting client. A report groups object 502 provides a listing of a collection of reports that are executed as a group. By employing report groups object 502, multiple reports may be generated from a single report command. A requests object 504 lists the actual invocation of a job, job stream, or report group. For example, a report group may be defined and executed 25 times with each execution being a request initiated by another request. Requests object 504 records related information such as when a request was initiated, did it successfully complete, when did it complete and which resources were employed.

A standard objects 510 category of dictionary objects is comprised of major and minor objects for use by the target application. Major objects including a preferences object 512 that provides a listing of preferences incorporated into the target application. A predefined style of general ledger accounting books is an example of a preference. A system object 514 provides storage for variables that are set by the system such as current time and date, system user, responsibility name, and session number. These values are loaded by the environment at run time. A messages object 516 is structured data that passes between processes. For example, a data feed (e.g., data source 618 of FIG. 10) may provide new stock trade prices that are to be applied to the application database associated with the target application. The price data is converted by messages object 516 into a message structure which is a standardized means for communicating between processes Once the message is transferred, the receiving process will know how to decode and process the message because it was packaged in a message format.

Minor objects within standard objects 510 include an action types object 518 that provides a definition of standard actions. It should be noted that transactions may invoke actions which may fall within a finite number of action types. These standard action types may be common among multiple target applications. An implementation types object 520 provides a descriptor of the type and version of application database software employed in the target application. Examples of database types and versions include, among others, Oracle7, Oracle8, and Sybase System 11. A languages object 511 provides a descriptor for the user interface language to employ in the present configuration of the target application. A constants object 524 provides a listing of predefined literal values for use by the target application. A button types object 526 provides a listing of selected preferential button styles to be displayed by the frame composer. A transaction styles object 528 provides a definition of the visual presentation of a transaction. Transactions may be defined to contain a specific style. A display styles object 530 provides definitions of a style within which to present data, such as a listing of options or lists with boxes for checking a selection. A machine makes object 532 defines the hardware upon which the target application executes while an operating systems object 534 defines the operating system upon which the target application executes.

FIG. 7 represents a simplified block diagram of software components and standards internal to the universal application, in accordance with a preferred embodiment of the present invention. Universal application 108 forms an executable infrastructure for performing re-usable and customizable processes among successive target applications.

An analyzer module 224 provides an analysis tool for evaluating the contents of a set by providing a spreadsheet-like interface. When an application designer initiates analyzer transaction 224, analyzer transaction 224 retrieves data matching a search criteria and produces an analysis sheet, and in the preferred embodiment, containing one row for each distinct value returned in a row field and one column for each distinct value returned in a column field.

An auto test module 226 provides an interactive facility for automatically testing target applications by simulating interaction such as keystrokes and mouse clicks representative of interaction by an end-user. When executing auto test module 226, an internal reporter creates a report that documents every simulated end-user interaction with the target application in addition to every response initiated by the target application in response to user input data. In the preferred embodiment, auto test module 226 further comprises a utility that automatically compares current test results with approved test results and issues a report enumerating the differences. Auto test module 226 provides automated testing thereby contributing to shortened software development cycles and significantly improved application quality as compared to current industry practice.

A reporter module 228 facilitates the creation of database-based reports. In the present embodiment, reporter module 228 interprets a high level language description of reports and correspondingly retrieves data and creates the reports as described. As with the development of frames, report module 228 automatically designs reports from a report description and provides automatic formatting by relying on default parameters internal to report module 228. However, reporter module 228 accepts formatting directives for permitting preferential relocation of data elements within a report. Unlike other database report creators, reporter module 228 creates reports from run-time data values located in the application database as opposed to potentially stale data values resulting from reports created from warehoused data. Furthermore, reporter module 228 employs logical database definitions contained within dictionary 106 (FIG. 3) as opposed to physical database definitions which are frequently arcane. Therefore, as physical database implementations may evolve, reports created by reporter module 228 remain consistent with the data definitions resident within dictionary 106.

A data mover module 230 facilitates moving data from one database to another and for moving non-database files from one node to another. Due to the complexity of database systems, movement or migration of data from one computer to another or from one database to another, such as to and from legacy systems, generally requires astute manual programming. Data mover module 230 facilitates movement of data across different database designs, heterogeneous databases, access methods, or file systems located within a network. Data mover module 230 also facilitates data comparison, collection and consolidation of data, replication of data, and various other data movement-related functions.

A client module 232 is a configurable, data-driven, client-based transaction processor that reads information about transactions to manage transaction processing and its associated user interface frames. Client module 232 evaluates the information regarding the transactions and their underlying sets and determines the optimal method for generating the SQL code for interfacing with the application database. In a client-server configuration, client module 232 interfaces with a server having portions of the universal application located thereon by generating messages for transferring between client and server portion of the universal applications.

A frame composer module 234 using frame standards and content descriptions from dictionary 106, designs windows or frames for presentation to an end-user during execution of the target application. Modem, sophisticated target applications must be intuitive, consistent, and easy to use in order to satisfy customer expectations. Target applications employ graphical user interfaces to achieve such expectations. In the present invention, a frame includes a window, panel or screen created for an end-user's perception. Due to the large number of frames in complex applications, the present invention stores a description of the frame and creates or composes the frame via frame composer module 234 rather than storing a series of previously painted frames. Furthermore, because the present system composes frames from a description within dictionary 106, successive frames present a consistent frame theme rather than stylistically divergent frames which frequently result from frames painted or created by different application programmers.

A manager module 236 is a configurable, data-driven, server-based scheduler that invokes and manages the execution of server tasks. A task, as defined in the present invention, is a stand-alone server program or subroutine that manager module 236 executes. An application designer defines allowable tasks and stores each allowable task in a server-resident manager database including a description of how manager module 236 should invoke the task such as invoking the task as a subroutine, a stand-alone program or by delegating invocation to another manager module generally on another server. An example of standard tasks invoked by manager module 236 include tasks designated to read from and operate on application database 102 as well as the dictionary 106.

A database library module 238 performs database operations on other modules or libraries. For example, when a target application needs to access or operate on data from a database, the target application calls functions from database library module 238 requesting the desired service. In the present invention, database library module 238 permits an external definition of the application databases on which the target application operates in dictionary 106. Furthermore, as described earlier, dictionary 106 stores a definition of basic groups of data, called sets, on which the target application will operate. Then, the target application invokes database library application programmer interfaces (APIs) to operate on data within the application database.

A transport engine module 240 provides transport evaluation capability for determining the type of transport protocol to invoke when transferring between physical platforms such as whether to invoke TCP and when to invoke such a protocol. Additionally, transport engine module 240 determines the most efficient routing for messages and the transfer timing of such messages. Transport engine module 240, in conjunction with network library 264, is the component that facilitates communication between different computers.

Compiler module 242 converts a high-level programming language description into portable metafile data. In the present invention, a high-level language is defined which facilitates rapid prototyping due to the high-level nature of the language. The high-level language employed by the present invention allows mundane programming functions such as variable declaration and I/O processing to be performed by the software architecture without requiring low-level programming for each transaction or action involving the database.

A language module 244 provides the high-level language syntax of the for invocation by the target application of transactions such as report generation, and database management. The high-level language is not a traditional procedural language, therefore the low-level mechanics of the language are hidden from the view of the target application designer.

A metafile library module 246 provides a grouping of the high-level language descriptions in a compiled format capable of being executed by the target application. As disclosed above, traditional programming requires a significant amount of variable declaration. Metafile library module 246 includes the definitions of variables to support the use of the high-level language used for limited programming of reports by the application designer.

A regression test library module 248 supports unit, system, and regression testing of libraries, engines, composers, server programs, universal application components, and complete target applications. Testing may be performed periodically and is performed automatically based upon the test criteria determined upon creation of the target application or component being tested. Because the test criteria is determined in advance, revisions to the target application may still rely upon the earlier-defined test values without requiring additional changes to the test parameters.

An options file library module 250 contains functions and specifics about the operating environment of the target application. Specifics may include preferences such as user-defined settings and configurations like date/time format preferences and currency preferences.

A validation library module 252 performs field validations and cross-field validations according to user-defined constraints placed upon specific data fields. Constraints, such as those common to relational database systems, provide data checks for data entered within transactions for storage within a field of an application database. Validations reduce data errors and confusion when values are combined or manipulated by displaying requested values, thus aiding in diagnostic testing, performance evaluation and application tuning of the target application.

Knobs and dials library module 254 allows an application designer to turn on diagnostics for different layers of the universal application 108, depending on which one is determined to be misbehaving or requires analysis and tuning. For example, SQL generated for a portion of the technology may be displayed for evaluation as well as the timing associated with the execution of the SQL by the database software such as Oracle.

An error library module 256 provides the requisite functionality to trap and report errors discovered by the architecture of the present invention and present a warning of such conditions to an application designer.

A common routines library module 258 provides a layer between an operating system library module 260 which is the portion that is ported between different operating systems such that all other portions of the universal application port directly.

Operating system library module 260 may require adjustments and recompilation between operating system platforms. Operating system library module 260 ensures portability of the universal application 108 by supporting various operating systems such as Unix, Windows 95, Windows NT, etc.

A datascope module 262 provides an analytical tool for use in testing in a visual format the contents of sets as previously defined. For example, if a set is created and an application designer desires to visually see the contents of a set without actually building a transaction and writing a report to present the data of the set, datascope module 262 provides a tool for opening and reading the contents of a defined set.

A network library module 264 provides a set of routines for supporting various industry-standard protocols such as DCOM, CORBA, and TCP/IP. The transport engine module 240 uses the network library module 264 routines.

A message library module 266 provides a set of routines for manipulating messages. For example, if a transaction is tasked with putting a data element into a database, a message type would be assigned and message library module 266 would read the definition of the message from message library module 266 to determine the structure of the message to be transferred. Message library module 266 provides a set of APIs for populating, reading, creating, and sending messages.

An integrity checker module 268 is a series of routines that looks and examines the data in an application database 102 in order to verify that the data maintains a defined quality or integrity. For example, applications data stored in a relational applications database may be inappropriately updated and modified by a database manipulating utility. Such utilities may not maintain appropriate constraints upon data values entered within the application database. Integrity checker module 268 performs a processing function of verifying the integrity of data resident within an application database according to previously defined constraints upon such data. Integrity checker module 268 obtains these data constraints by reading the definition of the application from the dictionary 102.

A server module 270 provides a series of server processes or components that may be shared by servers operating within the target application. Servers as known within the present invention are detailed in FIG. 10.

Figure 10:
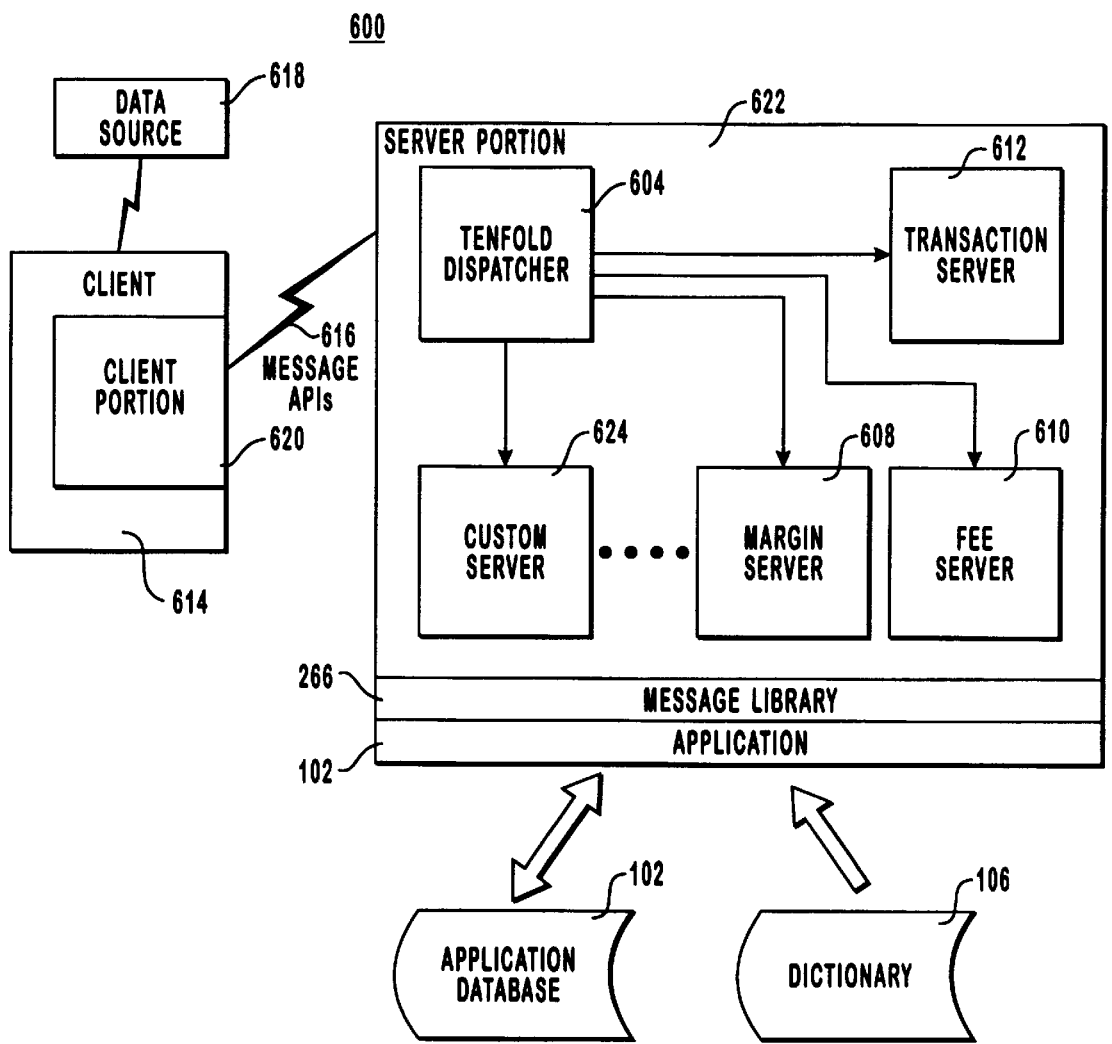
FIG. 10 is a simplified diagram of client-server partitioning of the execution of a target application, in accordance with an embodiment of present invention.

A transaction server module 272 provides a more generic version of a server for processing transactions. Servers, as detailed in FIG. 10, provide custom processing of portions of transactions. Transaction server provides similar functionality with the client portion of the universal application without requiring a user interface for initiation or activation of transactions.

A summary engine module 274 provides a process for collecting and generating a summarization of a collection of data elements when requested and furthermore preserves the results of the summarization process for a subsequent summary request.

A hierarchy engine module 276 provides the ability to define and use hierarchy as previously described described in FIG. 6. For example, a user may desire to evaluate a list of offices within a specified region. Subsequently, the user may desire to "drill down" or decompose the selection into its subelements to evaluate smaller regions, which process may continue down to the lowest level as defined in the hierarchy.

A transformation server module 278 provides the ability to transfer data defined as a first structure into data defined as a second structure. For example, in a purchasing target application a user may specify a purchase order set for receiving data therein and subsequently desire to convert the purchase order set into an approved purchase order set. Transformation server module 278 provides the rules necessary to transforming one set of data into another set of data.

A C-coding standard 280 defines the format for coding of custom portions of the target application. By requiring a standard for coding of custom portions of the target application, portability is maximized between platforms such as UNIX and Windows environments. Additionally, by enforcing a standard for custom coded modules, readability, and understandability of the custom portions are maximized thereby improving the ease with which others may maintain and integrate custom software modules.

A user interface library 282 provides a set of user interface routines that provide the graphical front-end for a variety of graphical interfaces such as Motif, Windows, and others. By providing a user interface library, the other components of the universal architecture may remain unified with the library being switched depending upon the user front-end being employed.

A message standard 284 provides an interface mechanism for exchange of information between the architecture, such as a target application, and other external components. While APIs are used to exchange information and communicate between processes within the target application, messages are used to communicate with other components or entities outside the architecture.

A graphic interface standard 286 provides a standard for the development of menus, buttons, and display related information for providing a consistent look-and-feel to the presented data. A graphic interface library 288 provides the actual routines employed for taking information to be displayed and calling the user interface library 282 to determine how to place information on the display screen for presentation to the user of the target application.

A release management component 290 provides version or configuration control of successive iterations or revisions of the individual components within the universal application and also provides management and control for other components such as the target application dictionary. Release management component 290 verifies that each of the versions of the components within the universal application are compatible with the operating system of the host on which the target application will be executed.

An interpreter 292 reads the architecture language by referencing metafile library 246 and extracting pseudocode for translation by interpreter 292 into executable code for execution by the architecture. A metafile standard 294 provides a standard for higher level coding of functionality using architecture language that is stored and crossreferenced within metafile library 246 for execution by the architecture.

A preference standard 296 provides a method for generating run-time parameters that are soft-coded as preferences for modifying performance of the architecture at run-Page time without modifying the structure of the architecture code.

Figure 8:
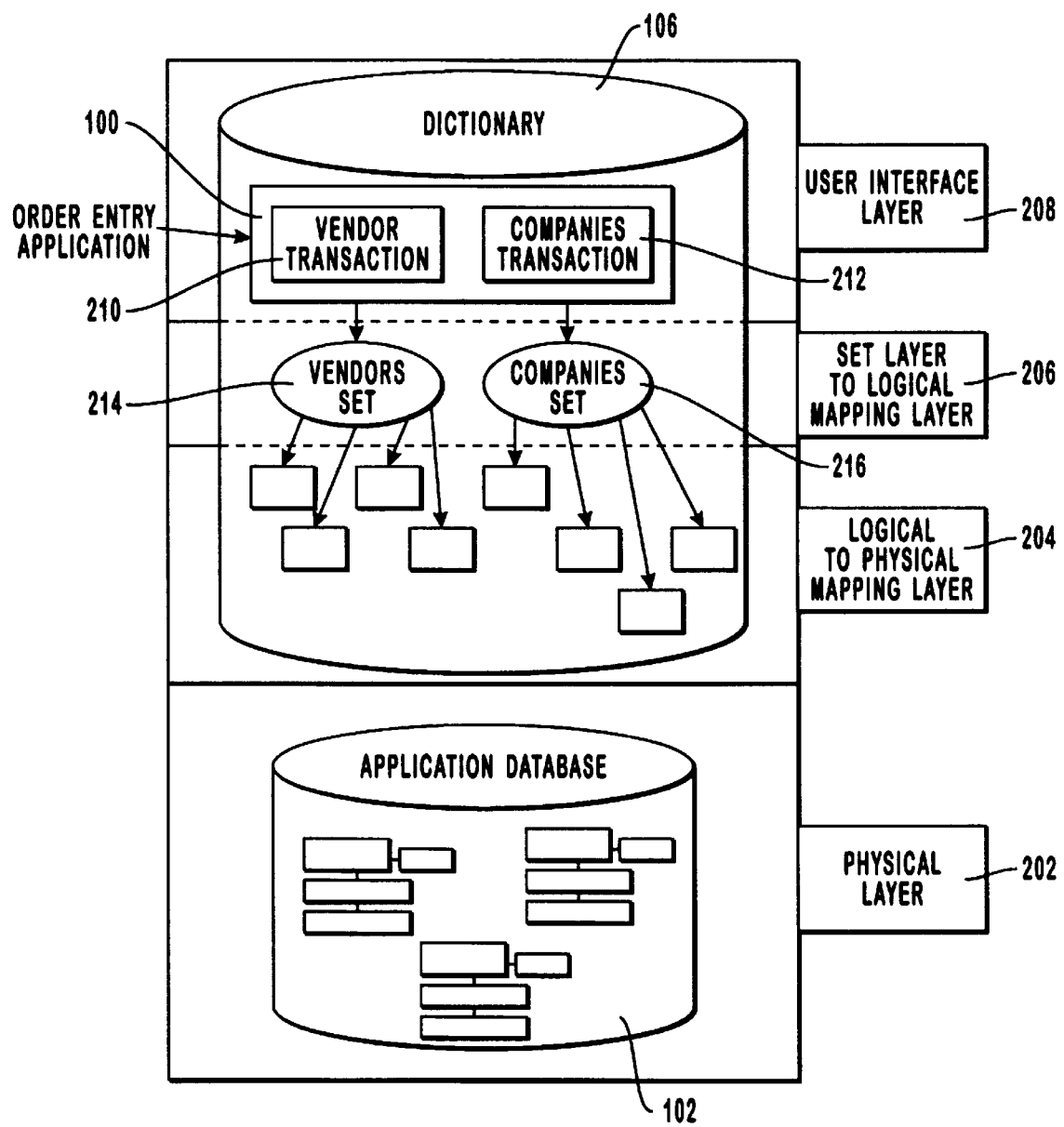
FIG. 8 is a simplified diagram representing an exemplary stratification of the relationships between the various layers of the dictionary and the application database of the present system, in accordance with an embodiment of the present invention.

FIG. 8 is a simplified diagram representing an exemplary stratification of the relationships of the current invention, in accordance with an embodiment of the present invention. A dictionary 106 may be considered as being stratified or having various layers interconnected through definitional links. A target application 100 is comprised of a series of transactions, in FIG. 8 exemplary shown as a vendor transaction 210 and a companies transaction 212, forming an order entry target application 100. A user interface layer 208 describes prototyped transactions as previously described in prototype transactions module 190 (FIG. 5). As transactions, reports, analyses, or server programs operate upon data from a database that has been grouped into one or more sets, dictionary 106 is further comprised of a definition of those sets. As shown in FIG. 8, exemplary descriptions of sets include a vendor set 214 and a company set 216 corresponding to vendor transaction 210 and companies transaction 212, respectively. A set layer to logical mapping layer 206 is established by employing prototype sets module 180 (FIG. 5) to establish the grouping or collection of transactional relevant data into a set.

Prototype database module 170 (FIG. 5) facilitates the logical to physical mapping layer 204 wherein data elements included within a set and containing logical definitions are mapped to physical data locations or structures. A physical layer 202 is comprised of the physical data elements as organized in a schema within an application database 102. Application database 102 may be configured using well-known techniques such as third normal form (a design technique), data definition language (DDL) or other database partitioning techniques such as those proprietary to Oracle or Sybase.

Figure 9:
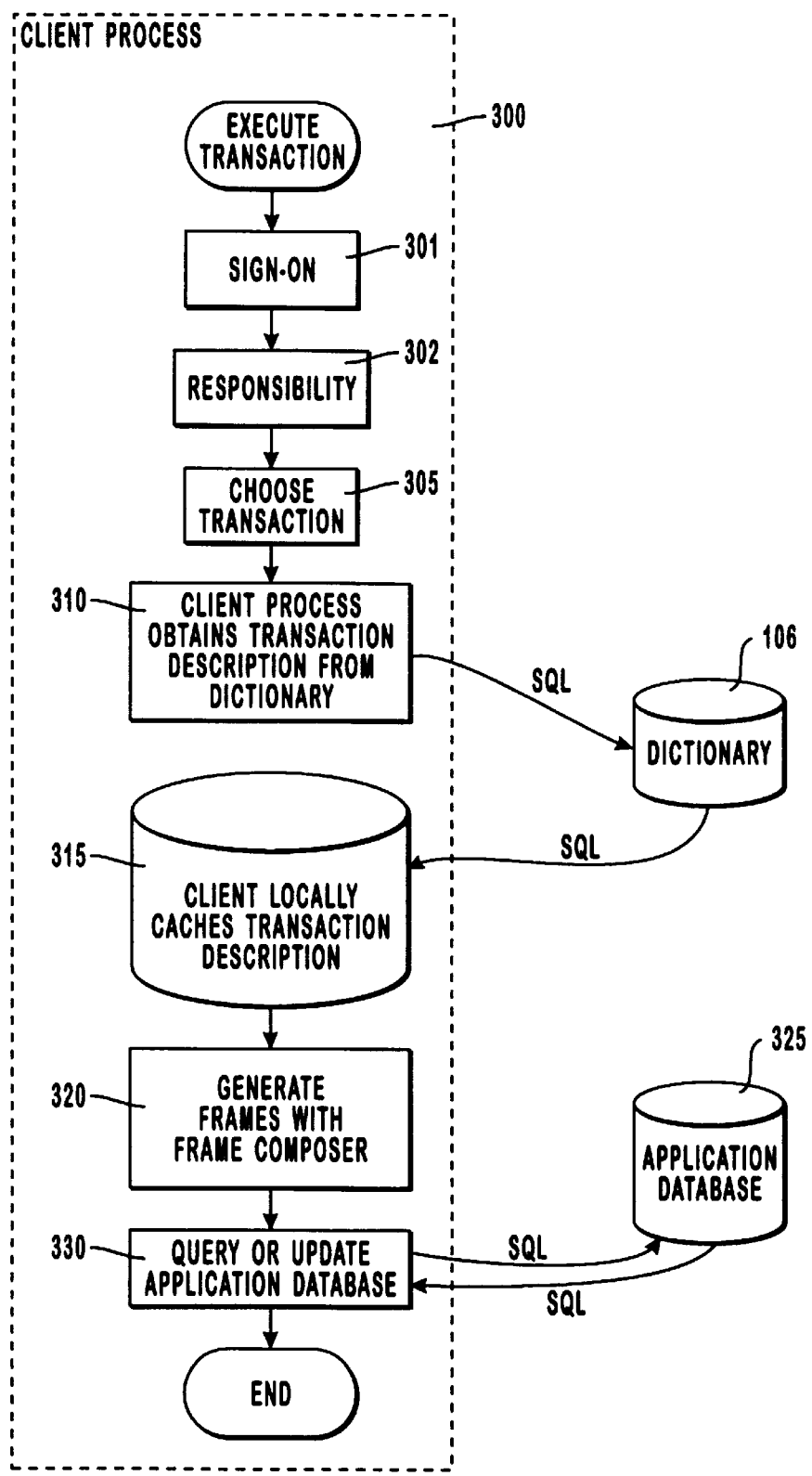
FIG. 9 is a simplified diagram representing execution of an on-line, interactive transaction, in accordance with an embodiment of the present invention.

FIG. 9 is a simplified diagram representing execution of an interactive transaction, in accordance with an embodiment of the present invention. As discussed in FIG. 2, universal application 108 may be partitioned into a client portion and a server portion. A client portion or process 300, in the preferred embodiment, initiates the execution of an interactive transaction. On an end-user workstation at the operating system level an icon designating a previously defined target application is presented to the end-user. The end-user then selects and launches the target application. In the preferred embodiment, the target application icon links to a bat file (in Windows 95®, and similarly, but differently in Windows NT®, OpenLook, Motif®, or other windowing operating systems) which in turn launches client module 232 (FIG. 7) with a directive to employ the specified target application dictionary 106 for obtaining customization behavior for the universal application. Client process 300 presents a sign-on process 301 requiring the end-user to supply a pre-defined user name and password. If the user name and password are correct, client process 300 displays a responsibility process 302 offering the end-user the choice of responsibilities to which the end-user is entitled based upon pre-defined authorizations associated with that end-users user name and password. If the end-user is authorized for only a single responsibility, client process 300 automatically chooses it. Once the end-user chooses a responsibility, client process 300 displays a frame containing options or menus to the end-user whereupon an end-user in a choose transaction step 305 successfully navigates a menu hierarchy to arrive at a desired transaction.

Client process 300 in a step 310 creates the appropriate SQL for interrogation of the dictionary database. As described above, dictionary 106, in the preferred embodiment, is implemented as a database upon which the database engine employs SQL commands for requesting and returning data from dictionary 106 to client process 300. In the preferred embodiment, client process 300 in a step 315 locally caches or stores the description of the transaction on the local workstation or computer hard drive. Such local caching removes the need for client process 300 to remotely access dictionary 106 thereby incurring a performance set-back. In client process 300, a step 320 creates a transaction frame by employing frame composer module 234 (FIG. 7) within universal application 108. When a transaction accesses or updates data in an application database, SQL code must be created for interrogation of application database 325. Application database 325 subsequently employs SQL code in returning the database data values for presentation by the transaction. The transaction presented to the end-user is comprised of one or more transactions selectable by the end-user and may perform functions such as querying or updating application database 325 in a step 330. Such querying or updating of data values within application database 325 also relies on the creation of SQL code for access to data within application database 325.

FIG. 10 is a simplified diagram of client-server partitioning of the execution of a target application, in accordance with an embodiment of the present invention. As briefly described above in FIG. 2, a target application is comprised of a dictionary 106 and a universal application 108 (FIG. 2) which may be comprised of a client portion and a server portion which interfaces to an application database 102. For application configurations that may require more extensive processing, a distributed architecture provides a more efficient distribution of task execution. FIG. 10 illustrates a more peer to peer distributed architecture, in accordance with an embodiment of the present invention. An application designer during the creation of a target application or a system administrator of a completed target application may configure and distribute portions of the universal application according to the processing capability of the target installation hardware and operating system and communications software. Such a distribution of the universal application appears transparent to a user of the target application.

Referring to FIG. 10, a user interfaces to the target application via a client workstation 614 which may take the form of a personal computer or a more sophisticated computational environment such as a Unix workstation. A user invokes execution of the target application, which in turn initiates a client portion 620 of universal application 108 (FIGS. 2 and 7). Client portion 620, in the preferred embodiment, is comprised of client 232 (FIG. 7) which is comprised of a suite of messaging APIs for facilitating the exchange of processing directives and data within client-server architecture 600. Messaging APIs 616 provide a common interface with server portion 622 which may be physically collocated within client workstation 614, or in the preferred embodiment resides on a separate server machine interconnected to client workstation 614 via standardized networking techniques.

During the course of execution of a target application, a user is presented with a series of menus, which terminate in either additional menus or transactions as described above. Client portion 620 dispatches transaction requests via message APIs 616, which are evaluated by a dispatcher 604. Dispatcher 604 evaluates the messages to determine which server processes the transmitted requests. Dispatcher 604 transfers the requests to the designated servers for processing or to another instance of dispatcher 604 which may be present on another server. When portions of a target application require specialized or sophisticated processing, an application designer may create a custom server 624 for processing a specific request or a series of requests. FIG. 10 illustrates two such customized servers, a margin server 608 and a fee server 610, for use in an exemplary stock market target application.

As discussed above, the execution of a target application is customized by the contents of dictionary 106. Thus, when a user initiates a target application, dictionary 106 must be periodically consulted. To facilitate retrieval of data from the dictionary database, client portion 620 issues message APIs consistent with the previous discussion to server portion 622. A transaction server 612, in addition to servicing non-specifically requested server requests, transfers message request to message library 266 which autonomously presents the required SQL coding required to interrogate an application database 102 for retrieving elements of dictionary 106. Such message processing also facilitates the entering, retrieving, or modifying data within an application database 102.

The present architecture also facilitates receiving and presenting data to a third party source such as a data source 618 without requiring interaction by a user at client workstation 614. Data source 618 may take the form of a flat file for processing by the target application or other data feeds from which a target application may receive or transfer data there between.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A method for computer-assisted database management software creation of a target software application from a universal software application, said target software application for use in interacting with an application database, said method comprising the steps of:
    a) facilitating a high-level dialog via an application editor to derive a description representing a customization of said universal software application into said target software application;
    b) storing said description of said target software application in a dictionary, said dictionary to be accessed by said universal software application; and
    c) invoking said dictionary by said universal software application upon execution of said target software application to customize said universal software application as said target software application.

2. The method for computer-assisted database management software creation of a target software application as recited in claim 1, wherein said step of facilitating a high-level dialog comprise the steps of:
    a) uniquely identifying said target software application with a name;
    b) providing access security to said uniquely identified target software application;
    c) defining menus to navigate throughout said target software application to execute transactions; and
    d) defining said transactions to perform upon said application database within said target software application.

3. The method for computer-assisted database management software creation of a target software application as recited in claim 2, wherein said providing access security step comprise the steps of:
    a) designating responsibilities in which to partition end-users of said target software application from accessing and executing portions of said target software application exclusive to their designated responsibility;

b) identifying said end-users of said target software application; and c) associating said end-users of said target software application with at least one of said responsibilities.

4. The method for computer-assisted database management software creation of a target software application as recited in claim 2, wherein said defining transactions further comprise the step of creating sets of data from said application database on which said transactions operate, said sets forming a subset of data from said application database.

5. The method for computer-assisted database management software creation of a target software application as recited in claim 4, further comprising the step of defining a logical application database according to a schema from which said sets are derived.

6. The method for computer-assisted database management software creation of a target software application as recited in claim 5, further comprising the step of mapping said logical application database to said application database.

7. The method for computer-assisted database management software creation of a target software application as recited in claim 6, further comprising the step of defining said application database according to a schema when said application database is non-existent prior to creation of said target software application.

8. The method for computer-assisted database management software creation of a target software application as recited in claim 4, wherein said defining transactions step further comprise the steps of:

a) defining views of data from said sets, said views to form a collection of said data within said sets to present to said end-user;

b) defining frames from said views of data to display and arrange said data from said application database.

9. The method for computer-assisted database management software creation of a target software application as recited in claim 8, further comprising the steps of:

a) defining a smart code table comprised of a constrained domain of valid values for said data from said database; and b) presenting in said frames from which said end-user may select said constrained domain of valid values.

10. A system for computer-assisted creation of a target software application for database management of an application database, said system comprising:

a) an application editor to facilitate a high-level dialog to derive a description representing said target software application;

b) a dictionary in the form of a database to store said description of said target software application for subsequent referencing during execution of said target software application; and c) a universal application comprised of re-usable modules and upon execution, said universal application to invoke said dictionary to customize said universal software application to become said target software application as described to said application editor.

11. The system for computer-assisted creation of a target software application for database management of an application database as recited in claim 10, wherein said application editor comprises:

a) a module for uniquely identifying said target software application with a name;

b) a module for providing access security to said uniquely identified target software application;

c) a module for defining menus to navigate throughout said target software application to execute transactions; and d) a module for defining said transactions to perform upon said application database within said target software application.

12. The system for computer-assisted creation of a target software application for database management of an application database as recited in claim 11, wherein said module for providing access security comprises:

a) a module for designating responsibilities to partition end-users within said target software application from accessing and executing portions of said target software application exclusive to their designated responsibility;

b) a module for identifying said end-users of said target software application; and c) a module for associating said end-users of said target software application with at least one of said responsibilities.

13. The system for computer-assisted creation of a target software application for database management of an application database as recited in claim 11, wherein said module for defining said transactions further comprises a module for creating sets of data from said application database on which said transactions operate, said sets to form a subset of data from said application database.

14. The system for computer-assisted creation of a target software application for database management of an application database as recited in claim 13, wherein said application editor further comprises a module for defining a logical application database according to a schema from which said sets are derived.

15. The system for computer-assisted creation of a target software application for database management of an application database as recited in claim 14, wherein said application editor further comprises a module for mapping said logical application database to said application database.

16. The system for computer-assisted creation of a target software application for database management of an application database as recited in claim 15, wherein said application editor further comprises a module for defining said application database according to a schema when said application database is non-existent prior to creation of said target software application.

17. The system for computer-assisted creation of a target software application for database management of an application database as recited in claim 13, wherein said module for defining transactions further comprises:

a) a module for defining views of data from said sets, said views to form a collection of said data within said sets to present to said end-user;

b) a module for defining frames from said views of data to display and arrange said data from said application database.

18. The system for computer-assisted creation of a target software application for database management of an application database as recited in claim 17, wherein said application editor further comprises:

a) a module for defining a smart code table comprised of a constrained domain of valid values for said data from said database; and b) a module for presenting in said frames from which said end-user may select said constrained domain of valid values.

19. A computer-readable medium for computer-assisted database management software creation of a target software application from a universal software application, said target software application for interacting with an application database, said computer-readable medium having computer-executable instructions for performing the steps comprising:

a) facilitating a high-level dialog via an application editor to derive a description representing a customization of said universal software application into said target software application;

b) storing said description of said target software application in a dictionary, said dictionary to provide a database for invocation by said universal software application; and c) invoking said dictionary by said universal software application upon execution of said target software application to customize said universal software application as said target software application.

20. The computer-readable medium as recited in claim 19 wherein said computer-executable instructions for facilitating a high-level dialog further comprise computer-executable instructions for performing the steps comprising:

a) uniquely identifying said target software application with a name;

b) providing access security to said uniquely identified target software application;

c) defining menus to navigate throughout said target software application to execute transactions; and d) defining said transactions to perform upon said application database within said target software application.

21. The computer-readable medium as recited in claim 20 wherein said computer-executable instructions for providing access security comprise computer-executable instructions for performing the steps comprising:

a) designating responsibilities to partition end-users within said target software application from accessing and executing portions of said target software application exclusive to their designated responsibility;

b) identifying said end-users of said target software application; and c) associating said end-users of said target software application with at least one of said responsibilities.

22. The computer-readable medium as recited in claim 20 wherein said computer-executable instructions for defining transactions further comprise computer-executable instructions for performing the step comprising creating sets of data from said application database on which said transactions operate, said sets to form a subset of data from said application database.

23. The computer-readable medium as recited in claim 22 wherein said computer-executable instructions further comprise computer-executable instructions for performing the step comprising defining a logical application database according to a schema from which said sets are derived.

24. The computer-readable medium as recited in claim 23 wherein said computer-executable instructions further comprise computer-executable instructions for performing the step comprising mapping said logical application database to said application database.

25. The computer-readable medium as recited in claim 24 wherein said computer-executable instructions further comprise computer-executable instructions for performing the step comprising defining said application database according to a schema when said application database is non-existent prior to creation of said target software application.

26. The computer-readable medium as recited in claim 22 wherein said computer-executable instructions for defining transactions further comprise computer-executable instructions for performing the steps comprising:

a) defining views of data from said sets, said views to form a collection of said data within said sets to present to said end-user;

b) defining frames from said views of data to display and arrange said data from said application database.

27. The computer-readable medium as recited in claim 26 wherein said computer-executable instructions further comprise computer-executable instructions for performing the steps comprising:

a) defining a smart code table comprised of a constrained domain of valid values for said data from said database; and b) presenting in said frames from which said end-user may select said constrained domain of valid values.

\* \* \* \* \*